(12) United States Patent
Dan-Jumbo et al.

(10) Patent No.: US 9,604,419 B2
(45) Date of Patent: Mar. 28, 2017

(54) OBLONG CONFIGURATION FOR BONDED PATCH

(71) Applicant: The Boeing Company, Chicago, IL (US)

(72) Inventors: Eugene Dan-Jumbo, Bothell, WA (US); Russell Lee Keller, Maple Valley, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 14/331,001

(22) Filed: Jul. 14, 2014

(65) Prior Publication Data
US 2014/0322491 A1     Oct. 30, 2014

Related U.S. Application Data

(62) Division of application No. 12/689,151, filed on Jan. 18, 2010, now Pat. No. 8,815,132.

(51) Int. Cl.
*B29C 73/10* (2006.01)

(52) U.S. Cl.
CPC ......... *B29C 73/10* (2013.01); *Y10T 29/49732* (2015.01); *Y10T 428/24479* (2015.01); *Y10T 428/24802* (2015.01); *Y10T 428/24942* (2015.01)

(58) Field of Classification Search
CPC .............. B29C 73/10; Y10T 29/49732; Y10T 428/24479; Y10T 428/24802; Y10T 428/24942

USPC ......................................................... 428/212
See application file for complete search history.

(56) References Cited

U.S. PATENT DOCUMENTS

| 5,620,768 | A  | 4/1997 | Hoffmann, Sr. |
|-----------|----|--------|---------------|
| 5,709,469 | A  | 1/1998 | White et al. |
| 5,882,756 | A  | 3/1999 | Alston et al. |
| 8,409,384 | B2 | 4/2013 | Dan-Jumbo et al. |
| 8,449,703 | B2 | 5/2013 | Dan-Jumbo et al. |
| 8,540,909 | B2 | 9/2013 | Dan-Jumbo et al. |
| 2010/0233424 | A1 | 9/2010 | Dan-Jumbo et al. |

FOREIGN PATENT DOCUMENTS

WO    WO2010104745    9/2010

OTHER PUBLICATIONS

Federal Aviation Administration, Advisory Circular, "Part 26, Continued Airworthiness and Safety Improvements," AC No. 26-1, Dec. 3, 2007.
Federal Aviation Administration, Advisory Circular, "Damage Tolerance and Fatigue Evaluation of Structure," AC No. 25.571-C, Apr. 29, 1998.

(Continued)

*Primary Examiner* — Aaron Austin
*Assistant Examiner* — Lawrence Ferguson

(57) ABSTRACT

A patch for a structure has a rework area with an inconsistency formed therein. The patch comprises a patch body having at least two regions including a fail-safe region and a safe-life region encompassing the fail-safe region. The safe-life region has a mode I interlaminar fracture toughness that is less than the mode I interlaminar fracture toughness of the fail-safe region.

11 Claims, 9 Drawing Sheets

(56) References Cited

OTHER PUBLICATIONS

Federal Aviation Administration, Federal Aviation Regulations, Part 23, Section 573, "Damage tolerance and fatigue evaluation of structure," available at <http://www.flightsimaviation.com/data/FARS/part_23-573.html>, last visited Nov. 13, 2009.
Federal Aviation Administration, Federal Aviation Regulations, Part 25, Section 571, "Damage tolerance and fatigue evaluation of structure," available at <http://www.flightsimaviation.com/data/FARS/part_25-571.html>, last visited Nov. 12, 2009.
Hagan, "Nondestructive Evaluation and Underwater Repair of Composite Structures," Submitted to the Department of Mechanical Engineering, Massachusetts Institute of Technology. Dept. of Mechanical Engineering, Jun. 2008, available at <http://www.dtic.mil/cgi-bin/GetTRDoc?Location=U2&doc=GetTRDoc.pdf&AD=ADA485396>.
Kelly, Composite Structure Repair, Agard Report No. 716, Feb. 1984.
Tribley, B., "Mode-I Interlaminar Fracture Toughness of Carbon Fiber Composites," 2006.
Baker, "Bonded composite repair of fatigue-cracked primary aircraft structure," 1999.
Tran-Cong et al., "Reduction in Adhesive Shear Strains at the Ends of Bonded Reinforcements," Sep. 1997.
Mahadesh, "Optimum design of symmetric composite patch repair to centre cracked metallic sheet,"2000.

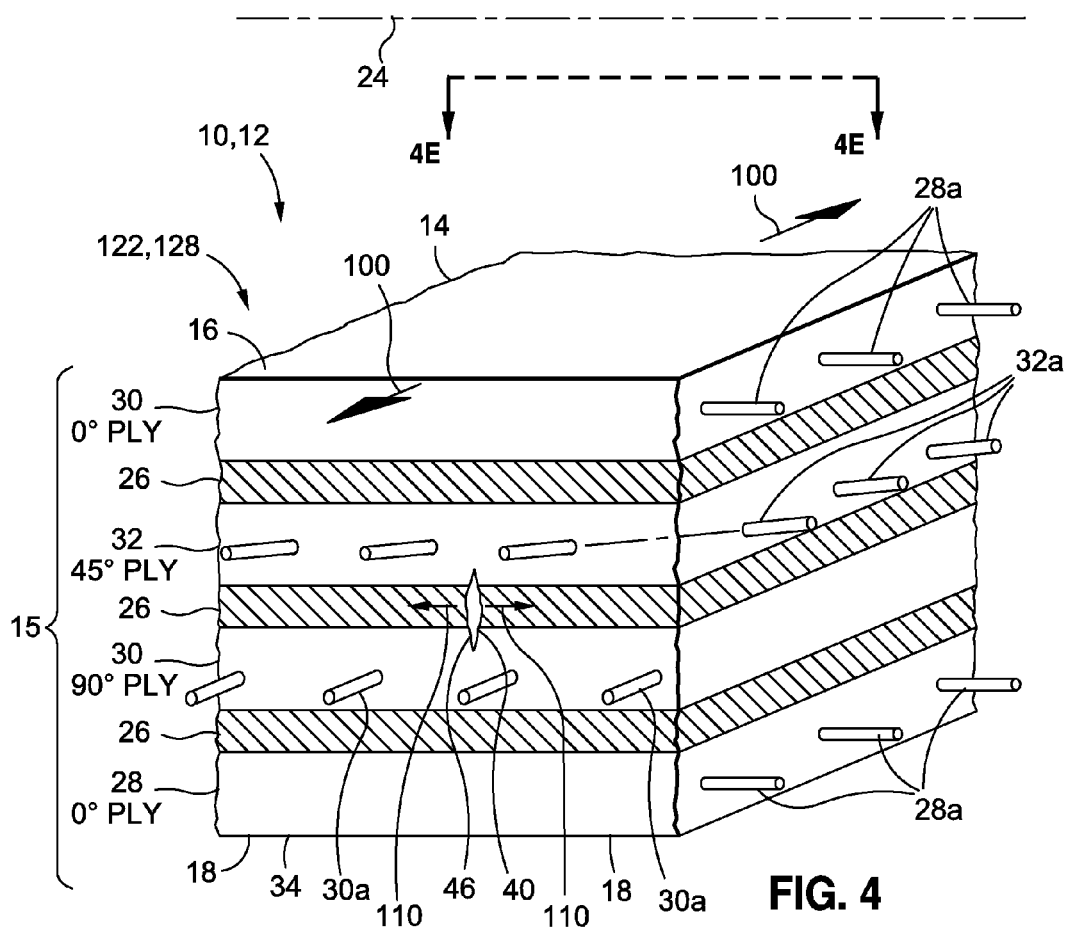
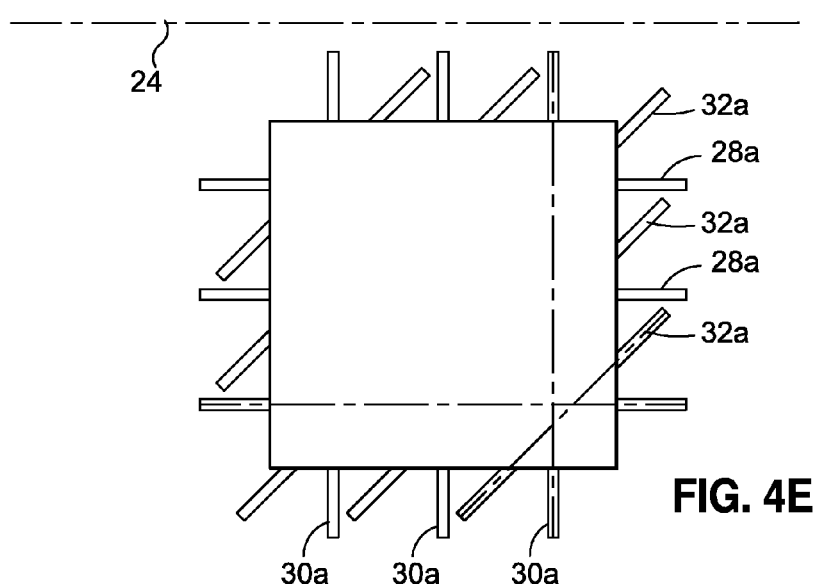
FIG. 4
FIG. 4E

OBLONG CONFIGURATION FOR BONDED PATCH

CROSS-REFERENCE TO RELATED APPLICATIONS

The present application is a divisional application of and claims priority to pending U.S. application Ser. No. 12/689,151 filed on Jan. 18, 2010, and entitled METHOD OF CONFIGURING A PATCH BODY, the entire contents of which is expressly incorporated by reference herein.

STATEMENT RE: FEDERALLY SPONSORED RESEARCH/DEVELOPMENT (Not Applicable)

FIELD

The present disclosure relates generally to composite structures and, more particularly, to a patch for installation in a rework area of a composite structure.

BACKGROUND

Composite materials are used in ever increasing quantities in a wide variety of industries. For example, commercial aircraft incorporate composite materials in primary and secondary structure due to the favorable mechanical properties of composite materials. Such favorable properties may translate into reduced weight of the aircraft and increased payload capacity and fuel efficiency. Furthermore, composite materials may provide an extended service life for the aircraft as compared to aircraft formed of conventional metallic construction.

Rework of composite structures is occasionally required in order to remove or compensate for inconsistencies in the composite structure. Such inconsistencies may comprise localized areas that may not conform to product and/or performance specifications for any one of a variety of reasons. For example, areas of the structure may be out-of-tolerance with product specifications because of inconsistencies such as, without limitation, voids, dents, delaminations and porosity in the composite structure.

The reworking of the composite structure may include removing a portion of the composite structure containing the inconsistency and replacing the removed material with a patch. Alternatively, reworking of the composite structure may include bonding a patch to the outer mold line of the structure over the area containing the inconsistency. The patch may be formed as a stack of plies of composite material which may be of the same or different type of material from which the composite structure is formed.

Reworked structures in commercial aircraft must typically meet federally-mandated strength requirements. Such strength requirements may include demonstrating that a reworked structure in an aircraft possesses the same strength characteristics that the composite structure possesses in its original condition. For metallic structures, a reworked area is typically visually inspectable such as from an exterior side of the structure to confirm the quality of the reworked structure. For example, a reworked metallic skin may include the installation of a splice that may be mechanically fastened to the skin with fasteners such as rivets which are visually inspectable to verify the integrity of the rivets and the splice.

However, the reworking of composite structures typically includes the use of adhesives such as epoxy for bonding a patch to a composite structure at a rework area. Because the entire adhesive bond joint that bonds the patch to the structure is typically not visually observable, it may not be possible to fully visually verify the integrity of the bonded joint between the patch and the structure. Furthermore, the durability of the bonded joint between the patch and the composite structure may not be readily determinable. Even further, conventional process controls for reworking of composite structures may limit the ability to confirm the integrity of the reworked composite structure.

In light of the above-noted limitations associated with inspection of bonded joints and in order to meet federally-mandated requirements for physically reworking of composite structures, conventional reworking practices may avoid complete reliance on the bonded joint as the primary load path and may rely on secondary load paths for certifying the bonded joint. In addition, the bonded joint between a patch and the composite structure may rely on mechanical fasteners installed around a perimeter of the patch. The mechanical fasteners may act as an arrestment mechanism to prevent peeling forces at the patch perimeter from exceeding the strength capabilities of the adhesive.

Unfortunately, the conventional practice of reworking primary structure may require specific authorization to perform the rework and may require supervision of the rework by an engineering authority. In addition, the reworking of primary structure may require highly-skilled technicians to perform the rework in a controlled environment. Furthermore, conventional practices for reworking composite structures such as by installing mechanical fasteners in the patch as crack arrestors may defeat the original purpose and intent of fastener-free composite structural design. Even further, the reliance on secondary load paths and the installation of mechanical fasteners in the bonded joint may increase the cost and complexity of the rework and result in an increase in weight.

As can be seen, there exists a need in the art for a system and method for reworking of a composite structure using a bonded patch that meets predetermined strength requirements. Furthermore, there exists a need in the art for a system and method for reworking a composite structure that provides improved confidence in the integrity of the bonded patch without the need for fasteners or reliance on secondary load paths. In this regard, there exists a need in the art for a design approach for reworking of composite structures that results in a predictable and fail-safe operating life of the reworked structure.

SUMMARY

The above-noted needs associated with reworking of composite structures are addressed by the present disclosure which provides a patch for installation on a structure having a rework area that may contain an inconsistency. For example, the inconsistency may comprise a localized discontinuity in an aircraft skin which may be associated with pressurization loads on the skin resulting in hoop stresses in the skin. The patch as disclosed herein provides the ability to arrest the propagation of the localized discontinuity or other inconsistency within the structure so that undesirable effects of the inconsistency may be mitigated and stresses resulting from the inconsistency may be redistributed to a larger area of the structure.

In an embodiment, the patch may comprise a patch body arranged in at least one of three regions each having an oblong shape. The patch body may be formed in a doubler configuration which may be mounted to an inner and/or outer mold line of the composite structure over the rework area. The patch body may alternatively be formed in a scarfed configuration wherein the patch body may be mounted within a rework area of the structure to replace material that may be removed from the structure. In an embodiment, the present disclosure includes a patch for a structure having a rework area with an inconsistency formed therein. The patch may comprise a patch body which may have at least two regions including a fail-safe region and a safe-life region encompassing the fail-safe region. The safe-life region may have a mode I interlaminar fracture toughness that is less than the mode I interlaminar fracture toughness of the fail-safe region to reduce the patch stiffness at the patch edge to minimize peel stress at the patch edge and to reduce interlaminar stress in the structure.

Also disclosed is a patch for a composite structure having a rework area with an inconsistency formed therein. The structure may be subject to a primary load oriented along a primary load direction and which may induce interlaminar stress in the structure and/or the regions. The primary load may also induce shear stress and peel stress in a bondline between the structure and the patch body. The patch may comprise a patch body arranged in at least one of three regions each having a substantially oblong shape. The oblong shape may have a length to width ratio within the range of from approximately 2.0 to 4.0. The oblong shape may define a long axis oriented substantially perpendicularly relative to the primary load direction. The patch body may be configured in a scarfed configuration and/or a doubler configuration. The regions into which the patch body may be divided may include a fail-safe region that may be sized to encompass the rework area and which may have a taper angle within the range of from approximately 10:1 to 30:1 and a mode I interlaminar fracture toughness within the range of approximately 2.5 to 7.0 in-lb/in$^2$.

The regions may also include a durability region that may encompass the fail-safe region and which may have a taper angle within the range of from approximately 20:1 to 40:1 and a mode I interlaminar fracture toughness within the range of approximately 2.0 to 5.0 in-lb/in$^2$. The patch may further include a safe-life region that may encompass the durability region and which may have a taper angle within the range of from approximately 35:1 to 55:1 and a mode I interlaminar fracture toughness within the range of approximately 1.5 to 3.5 in-lb/in$^2$. The safe-life region may be sized such that the strength of the bondline at an edge of the safe-life region is greater than the shear stress. The mode I interlaminar fracture toughness for each one of the regions may be greater than the interlaminar stress in the structure and the regions. The taper angle for each one of the regions may be such that the bond strength at an edge of the region is greater than the shear stress and peel stress in the bondline. The taper angles of the regions may decrease along a radially outward direction of the patch body.

Further disclosed is method of configuring a patch body for bonding to a structure having a rework area. The method may comprise the steps of dividing the patch body into at least two regions includes a fail-safe region and a safe-life region encompassing the fail-safe region. The method may further comprise selecting the mode I interlaminar fracture toughness of the safe-life region to be less than the mode I interlaminar fracture toughness of the fail-safe region.

Also disclosed is a method of configuring a patch body for bonding to a structure having a rework area. The structure may be subject to a primary load inducing interlaminar stress in the structure and peel stress and/or shear stress in a bondline between the structure and the patch body. The method may comprise the steps of dividing the patch body into at least three regions includes a fail-safe region, a durability region encompassing the fail-safe region, and a safe-life region encompassing the fail-safe region. The regions may be formed in a substantially oblong shape having a long axis. The long axis may be oriented into substantially perpendicular relationship to the primary load direction. The method may further comprise the step of forming the patch body in at least one of a scarfed configuration and a doubler configuration.

The fail-safe region may be sized to encompass the rework area. The safe-life region may be sized such that the bond strength at an edge of the safe-life region is greater than the shear stress. The durability region may be sized such that an edge thereof is located approximately midway between the edges of the fail-safe and safe-life regions. The method may further comprise the step of selecting a mode I interlaminar fracture toughness of the safe-life region to be less than the mode I interlaminar fracture toughness of the durability region. The fail-safe, durability and safe-life regions may be selected to fall within one of the following respective approximate range of mode I interlaminar fracture toughness values: 2.5 to 7.0 in-lb/in$^2$, 2.0 to 5.0 in-lb/in$^2$, 1.5 to 3.5 in-lb/in$^2$. The method may further include selecting a taper angle for each one of the regions such that the bond strength at an edge of the region is greater than the shear stress and peel stress in the bondline. The taper angle for the fail-safe, durability and safe-life regions may be selected to fall within the following respective approximate range of values: 10:1 to 30:1, 20:1 to 40:1, 35:1 to 55:1.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is an enlarged sectional illustration of the rework area with the patch removed for clarity and illustrating a plurality of plies joined by interlaminar resin layers and further illustrating an inconsistency formed as a crack;

FIG. 4E is a top view of the structure taken along line 4E of FIG. 4 and illustrating the relative fiber orientations of the plies;

DETAILED DESCRIPTION

Figure 1:
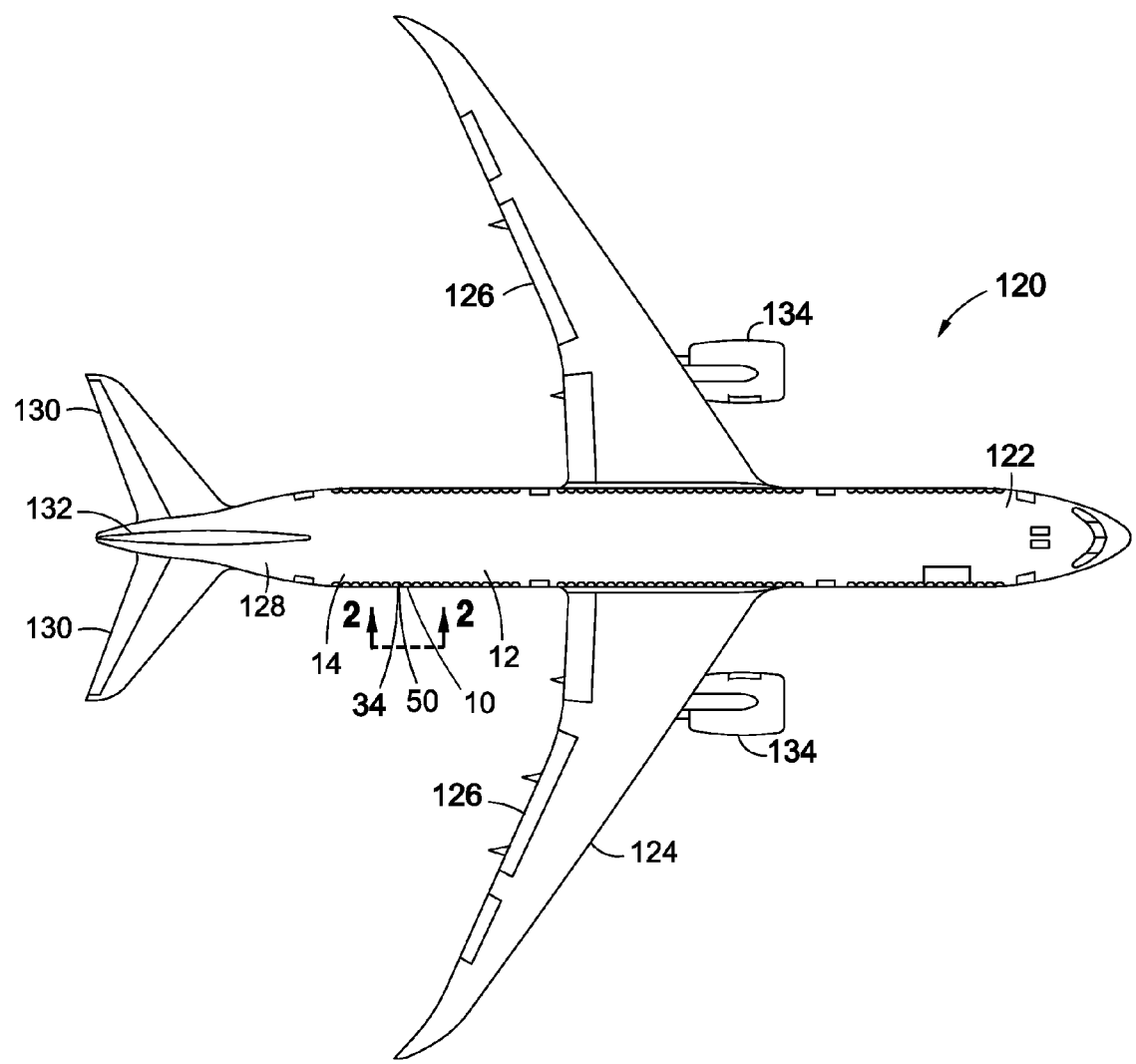
FIG. 1 is a top view of an aircraft having a composite structure onto which a patch may be applied such as to a rework area of the aircraft.

Referring now to the drawings wherein the showings are for purposes of illustrating preferred and various embodiments of the disclosure only and not for purposes of limiting the same, shown in FIG. 1 is a plan view of an aircraft 120 as a non-limiting example of one of a variety of applications wherein a patch 50 as disclosed herein may be applied to a rework area 34. In an embodiment, the patch 50 may comprise at least one of three regions 70, 72, 74 (FIG. 2) having mechanical properties that may be tailored to the composite structure 10 to which the patch 50 may be bonded. In this manner, the patch 50 may provide a structurally qualified and certifiable bonded joint 44 (FIG. 2) or rework area 34 (FIG. 2) as described in greater detail below.

Figure 2:
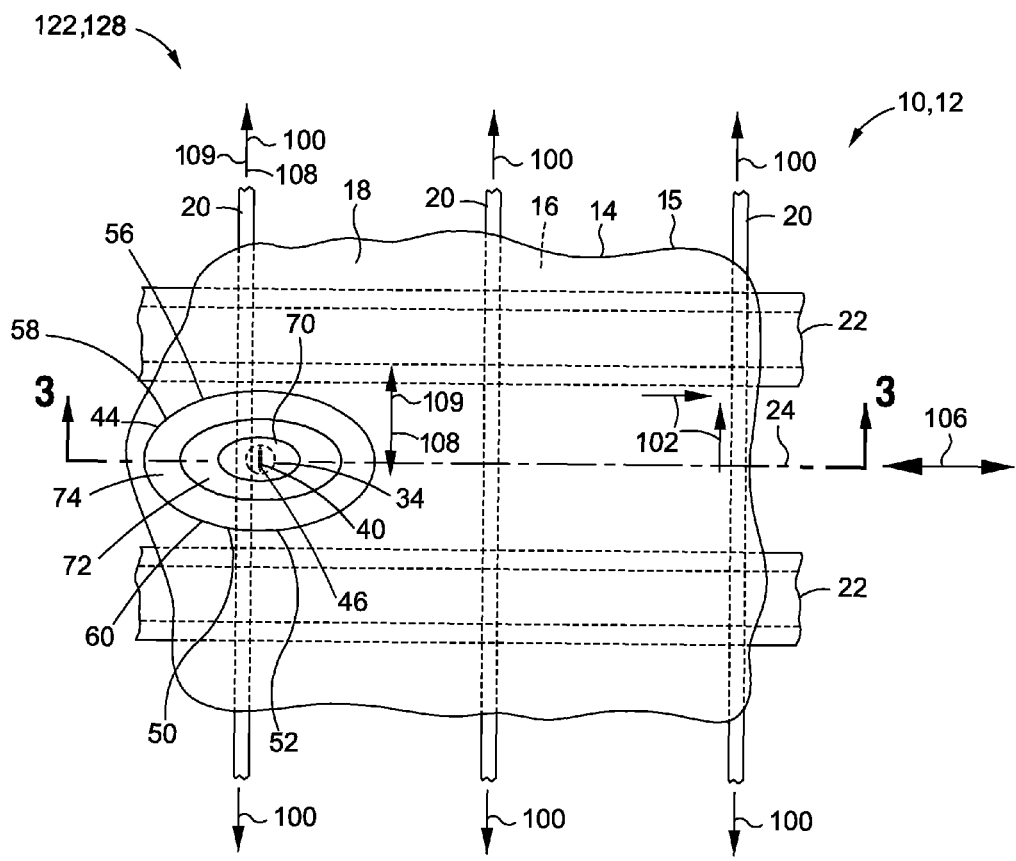
FIG. 2 is a side view of a portion of a barrel section of a fuselage including a skin having inner and outer mold lines and having the patch mounted thereto.

Advantageously, as shown in FIGS. 5-8, the patch 50 may be configured such that the mode I interlaminar fracture toughness 74b (FIGS. 7-8) of a safe-life region 74 of the patch body 52 (i.e., the outermost region of the patch body 52) is less than the mode I interlaminar fracture toughness 72b (FIGS. 7-8) of the fail-safe region 72 (the region nearest the safe-life region 74 in FIGS. 5-8) in order to reduce the patch 50 stiffness at the patch edge 58 (FIG. 2). In this manner, the reduced mode I interlaminar fracture toughness 74b (FIGS. 7-8) at the fail-safe region 70 reduces peel stress at the patch edge 58 (FIG. 2) as will be described in greater detail below. In addition, the mode I interlaminar fracture toughness 70b, 72b, 74b (FIGS. 7-8) values of the patch 50 may facilitate a gradual reduction in interlaminar stress 86 (FIGS. 7-8) in the structure 10 to mitigate or prevent growth or propagation of a crack 40 (FIGS. 2, 4, 5, 6) or other inconsistency 46 (FIGS. 2, 4, 5, 6). In addition, the patch 50 may optionally include decreasing taper angles $\theta_{FS}$, $\theta_D$, $\theta_{SL}$ (FIGS. 7-8) for each one of the regions 70, 72, 74 (FIGS. 7-8) along a radially outward direction 48 (FIGS. 7-8) in order to distribute interlaminar stress 86 (FIGS. 7-8) from the patch body 52 to the structure 10 as described in greater detail below.

As can be seen in FIG. 1, the patch 50 may be applied to an aircraft 120 which may include a pair of wings 124 extending outwardly from a fuselage 122. The aircraft 120 may include one or more propulsion units 134 mounted on the wings 124 or at any other suitable location. The aircraft 120 may include a tail section 128 having a horizontal stabilizer 130, a vertical stabilizer 132 and/or other control surfaces 126. The fuselage 122 may define a longitudinal axis 24 (FIG. 2) and may be comprised of one or more barrel sections 12 (FIG. 2). As indicated above, although the present disclosure describes the patch 50 in relation to an aircraft 120, the patch 50 may be implemented on any vehicular or non-vehicular application, without limitation.

As shown in FIG. 2, the barrel section 12 may comprise a skin 14 which may be bonded and/or mechanically fastened to one or more components including, but not limited to, circumferential frames 20 which may be axially spaced apart from one another as shown in FIG. 2. The fuselage 122 may further include stiffeners or stringers 22 which may extend longitudinally along the fuselage 122 in general alignment with the longitudinal axis 24.

Figure 3:
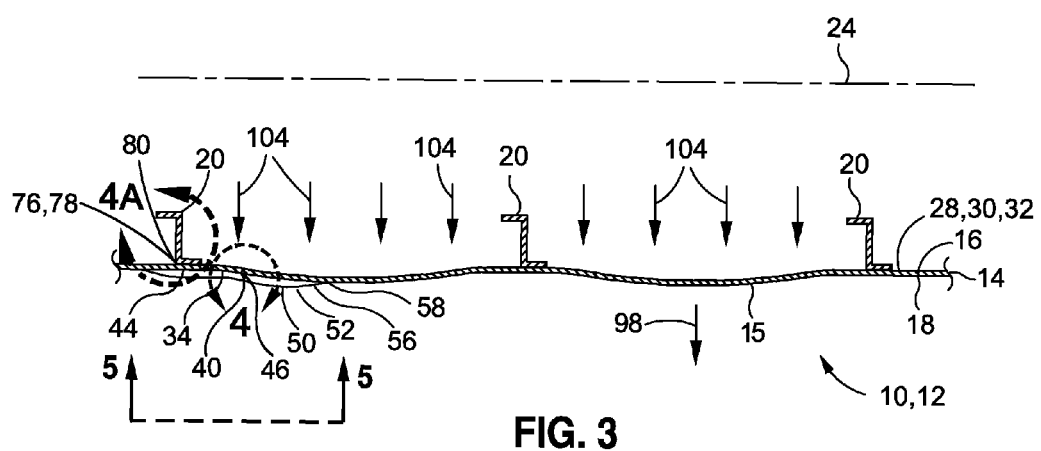
FIG. 3 is a sectional illustration of the barrel section taken along line 3-3 of FIG. 2 and illustrating hoop loads acting on the skin resulting from pressure differential between an interior and an exterior of the fuselage.

Referring to FIG. 3, shown is a cross-sectional illustration of the skin 14 mounted to the frames 20. The skin 14 and frames 20 may be sized and configured in relation to the loads to which the fuselage 122 may be subjected. For example, the frames 20 may be located at a suitable spacing for reacting pressurization loads 104 in combination with the skin 14. The pressurization loads 104 loads may result in loads in a hoop direction 100 (shown in FIG. 2 and oriented into the plane of the paper in FIG. 3) on the skin 122 (FIG. 1) and which may cause tension in the skin 122 (FIG. 1). As shown in FIG. 3, such pressurization loads 104 may be imposed upon the inner mold line 16 of the skin 14 as a result of a pressure differential between the fuselage 122 interior and the fuselage 122 exterior. The fuselage 122 exterior may be at a lower pressure than the fuselage 122 interior such as when the aircraft 120 (FIG. 1) is at a cruising altitude (e.g., 35,000 feet).

The pressurization loads 104 may be exerted on the inner mold line 16 of the skin 14 and may result in a pillowing effect of the skin 14 between adjacent frames 20 along the fuselage 122 barrel section 12. In this regard, the pressurization loads 104 may cause the skin 14 to move outwardly 98 as illustrated in FIG. 3 and which may be partially resisted by the frames 20 and/or the stringers 22. Other loads which may be imposed on the skin 14 may include axial loads 106 (FIG. 2) such as tension and compression loads resulting from bending of the fuselage 122 due to lifting forces produced by the wings 124 (FIG. 1). In addition, shear forces 102 (FIG. 2) may be generated within the skin 14 as the result of twisting or torsion of the fuselage 122 resulting from activation of the control surfaces 126 (e.g., FIG. 1—horizontal and vertical stabilizer 130, 132) in the tail section 128 (FIG. 1).

Referring still to FIG. 3, at the intersection of the skin 14 with the frame 20, relatively higher stresses may occur as compared to stresses in the skin 14 at a location midway between an adjacent pair of frames 20. The skin 14 may be formed of laminated plies 28, 30, 32 of composite material integrated with interlaminar resin layers 26. Alternatively, the skin 14 may be formed on at least on one side of a core 23 (FIG. 9) in a sandwich arrangement (not shown). Referring to FIG. 3, the sizing and material selection for the skin 14 of the aircraft 120 (FIG. 1) may be driven, at least in part, by the interlaminar tension and shear properties of the skin 14. The skin 14 thickness may be sized in consideration of the magnitude of the pressurization of the fuselage 122 (FIG. 1) occurring over the service life of the aircraft 120 (FIG. 1).

Referring to FIGS. 4 and 4E, shown in FIG. 4 is an enlarged perspective schematic illustration of the structure 10 having the patch 50 (FIG. 3) removed for clarity. FIG. 4 schematically illustrates a plurality of plies 28, 30, 32 that may make up the structure 10. The plies 28, 30, 32 may have differing orientations of fibers 28a, 30a, 32a as described below. The plies 28, 30, 32 may be joined by interlaminar resin layers 26 which are shown in exaggerated size in FIG. 4 for illustration purposes. As can be seen in FIG. 4, the structure 10 may include an inconsistency 46 which may comprise any number of different types of inconsistencies including, but not limited to, a crack 40 in the skin 14 as shown in FIG. 3. However, the inconsistency 46 may generally comprise localized areas that may not conform to product and/or performance specifications. Such inconsistencies may comprise, without limitation, voids, dents, delaminations and porosity in the skin 14 or in other areas of the structure 10.

FIG. 4 illustrates a transverse crack 40 which may occur as a result of cyclic pressurization loading of the skin 14. Such transverse cracking may occur in plies 15 having an off-axis orientation relation to a direction of loading of the skin 14. For example, as shown in FIG. 4E, the structure 10 may include 0° plies 28 having fibers 28a oriented generally parallel to the longitudinal axis 24 or axial load direction 106 (FIG. 2) to resist fuselage 122 bending loads which may place the skin 14 in tension and/or compression. FIG. 4E further illustrates the structure 10 which may also include 90° plies 30 having fibers 30a oriented generally perpendicular relative to loads in a hoop direction 100 (FIG. 2) on the fuselage 122 (FIG. 1). The skin 14 may also include ±45° plies 32 having fibers 32a oriented to resist twisting loads imposed on the fuselage 122 (FIG. 1) skin 14 such as during activation of the control surfaces 126 (FIG. 1) in the tail section 128 (FIG. 1). However, the structure 10 may be formed of plies having a variety of alternative fiber orientations and is not limited to plies having the orientations of the fibers as shown in FIG. 4E.

Figure 4A:
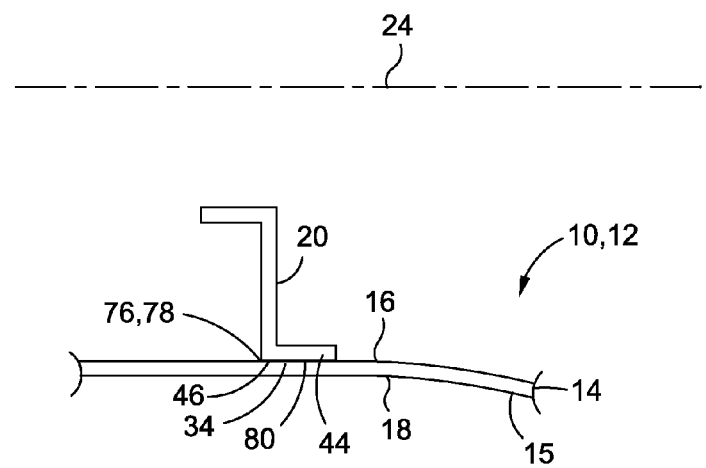
FIG. 4A is an enlarged sectional illustration taken along line 4A of FIG. 3 and illustrating a bondline between the skin and a frame.
Figure 4B:
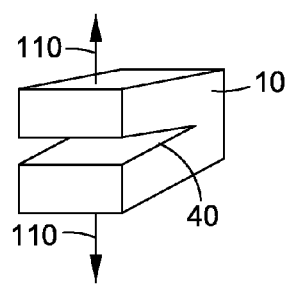
FIG. 4B is a perspective schematic illustration of mode I loading of a structure.
Figure 4C:
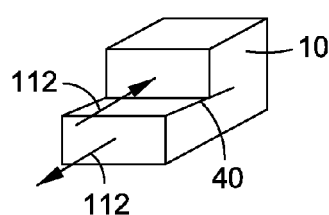
FIG. 4C is a perspective schematic illustration of mode II loading of a structure
Figure 4D:
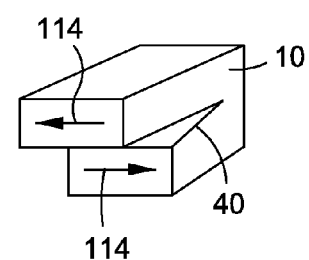
FIG. 4D is a perspective schematic illustration of mode III loading of a structure.

As shown in FIG. 4, the transverse crack 40 may occur in one or more of the plies 28, 30, 32 and/or in one or more of the interlaminar resin layers 26 and may generally manifest as a mode I fracture resulting from mode I stresses 110 as shown in FIG. 4B wherein the forces exerted on the structure 10 tend to open the crack 40 as shown in FIG. 4B. The structure 10 may also be subject to mode II stresses 112 (in-plane shear relative to the crack direction) acting on the structure 50 in a manner as shown in FIG. 4C and/or as mode III stresses 114 (out-of-plane shear relative to the crack direction) acting on the structure 50 in a manner as shown in FIG. 4D but generally to a less significant extent than mode I stresses (FIG. 4B). As can be seen in FIG. 4, the transverse crack 40 may extend into the adjacent plies 28, 30, 32 and/or interlaminar resin layers 26 between the adjacent plies 28, 30, 32 of the composite structure 10.

Referring to FIG. 4A, shown is an enlarged sectional illustration of the skin 14 having inner and outer mold lines 16, 18 and illustrating the inner mold line 16 bonded to one of the frames 20 with the patch body 52 (FIG. 2) removed for clarity in FIG. 4A. The structure in FIG. 4A may include an inconsistency 46 comprising a disbond 80 that may occur in a bondline 76 of adhesive 78 bonding components of the structure 10 such as between the skin 14 and the frame 20 or in any other location of the structure 10. The patch body 52 may be applied over an area having a disbond 80 similar to that which is shown in FIG. 4A to prevent growth or extension of the disbond 80 by sizing the regions 70, 72, 74 (FIGS. 5-7) of the patch body 52 to maintain stress in the bondline 80 at a level below the strength capabilities of the adhesive 78.

Referring briefly to FIGS. 2 and 3, the patch 50 as disclosed herein is preferably configured to prevent or minimize growth of cracks 40 or other inconsistencies 46 which may occur in the structure 10. In this regard, the patch 50 may include a patch body 52 which may be arranged in at least one of three regions 70, 72, 74 tailored to mitigate crack 40 growth. In addition, the patch 50 may provide a means for meeting federally-mandated requirements regarding tolerance of the patch to loads that may be imposed on the structure 10 and/or patch 50. Such loads may include the above-mentioned pressurization loads 104. In addition, such loads may result from discrete impacts such as those resulting from operational hazards.

In this regard, the patch 50 as disclosed herein may be configured to meet fail-safe provisions of federally-mandated airworthiness requirements in structure 10 such as the composite fuselage 122 barrel section 12 illustrated in FIG. 2. Furthermore, the patch 50 may be configured such that when bonded to the structure 10, the structure 10 and/or patch 50 may meet safe-life provisions of the above-mentioned airworthiness requirements. The patch 50 as disclosed herein may provide a bondline 76 (FIGS. 3, 7-8) with the structure 10 that facilitates a gradual reduction in interlaminar stress 86 (FIGS. 3, 7-8) in the structure 10 to mitigate crack 40 growth. Preferably, the mode I interlaminar fracture toughness 70b, 72b, 74b (FIGS. 7-8) values for each one of the regions 70, 72, 74 is also greater than the interlaminar stress 86 (FIGS. 7-8) in the respective regions 70, 72, 74 and in the structure 10 in order to minimize growth of an inconsistency 46 such as a crack 40.

Figure 7:
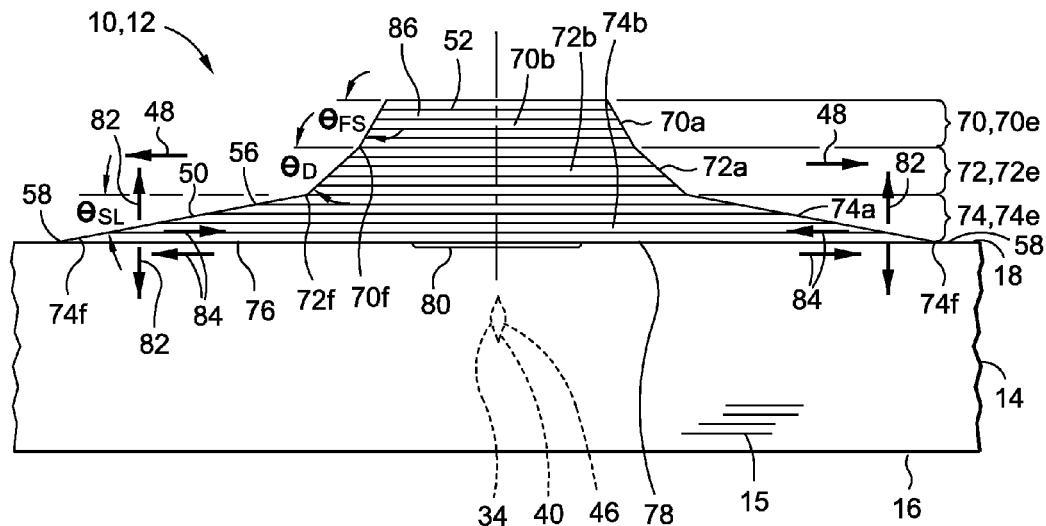
FIG. 7 is a cross-sectional illustration of the patch in a doubler configuration and being mounted to an outer mold line of the composite structure over the rework area.

Referring still to FIGS. 2-3, as was earlier indicated, the patch 50 may be divided into one or more of the three regions 70, 72, 74 (FIG. 2) with each region 70, 72, 74 having a different interlaminar fracture toughness 70b, 72b, 74b (FIG. 5) and/or a different taper angle $\theta_{FS}$, $\theta_D$, $\theta_{SL}$ (FIG. 7) formed on the patch body 52 (FIG. 2) as described in greater detail below. As shown in FIGS. 2 and 7, the patch body 52 may be formed in a doubler configuration 56 that may be applied to the outer mold line 18 of the skin 14. However, although not shown, the patch body 52 in the doubler configuration 56 may optionally be applied to the inner mold line 16 of the skin 14. Even further, the patch body 52 may be applied to an outer or inner mold line 18, 16 of a metallic structure. In a further embodiment shown in FIG. 8, the patch body 52 may be formed in a scarfed configuration 54 and may be applied to the skin 14 after removal of material encompassing the rework area 34 containing the inconsistency 46.

Figure 8:
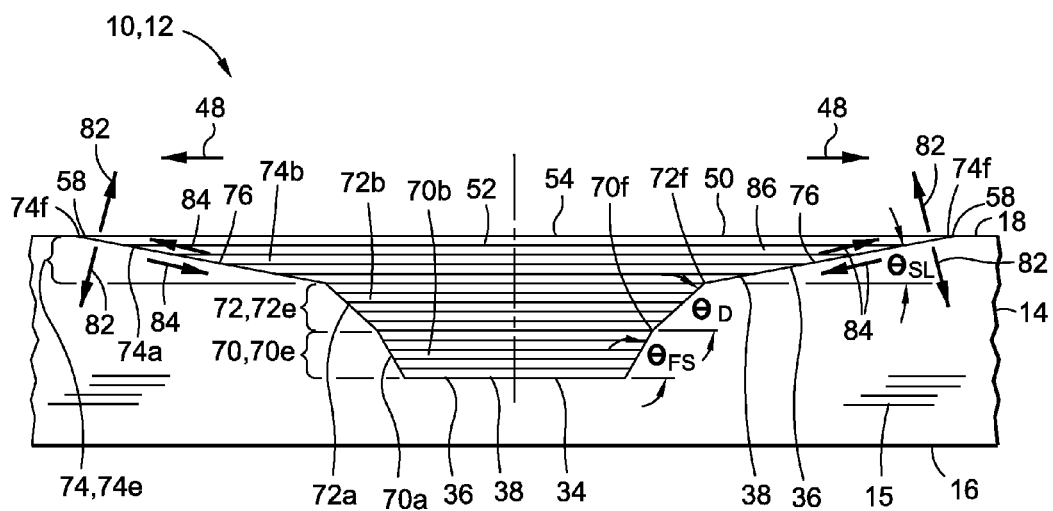
FIG. 8 is a cross-sectional illustration of the patch in a scarfed configuration wherein the patch body is mounted within a rework area formed by removal of material from the composite structure.

The patch body 52 (FIG. 8) in the scarfed configuration 54 (FIG. 8) may be applied to the skin 14 (FIG. 8) from the outer mold line 18 side as shown in FIG. 8, from the inner mold line 16 side (not shown) or in any combination thereof. Furthermore, although not shown, the patch body 52 may be formed as a combination of the doubler configuration 56 (FIG. 7) and the scarfed configuration 54 (FIG. 8). The patch body 52 in the doubler configuration 56 (FIG. 7) and/or the scarfed configuration 54 (FIG. 8) may be applied to any element having any size, shape and configuration and is not limited to application to a skin 14. For example, although specific examples are not shown, the patch body 52 may be applied to any skin 14, stringer 22, frame 20, or any other element, without limitation.

Referring to FIGS. 5-8, the regions 70, 72, 74 of the patch body 52 may be provided with preferably decreasing mode I interlaminar fracture toughness 70b, 72b, 74b values along a radially outward direction 48 of the patch body 52. In addition, the mode I interlaminar fracture toughness 70b, 72b, 74b values may be arranged such that the lowest mode I interlaminar fracture toughness 70b, 72b, 74b values are in the safe-life region 74 (i.e., outermost region) in order to reduce local stiffness in the patch body 52 relative to the structure 10. In addition, for the doubler configuration 56 (FIG. 7) of the patch body 52, configuring the regions 70, 72, 74 with decreasing mode I interlaminar fracture toughness 70b, 72b, 74b values along the radially outward direction 48 of the patch body 52 is believed to substantially retard or minimize the propagation of the inconsistency 46 through the structure 10 such as the skin 14.

Figure 5:
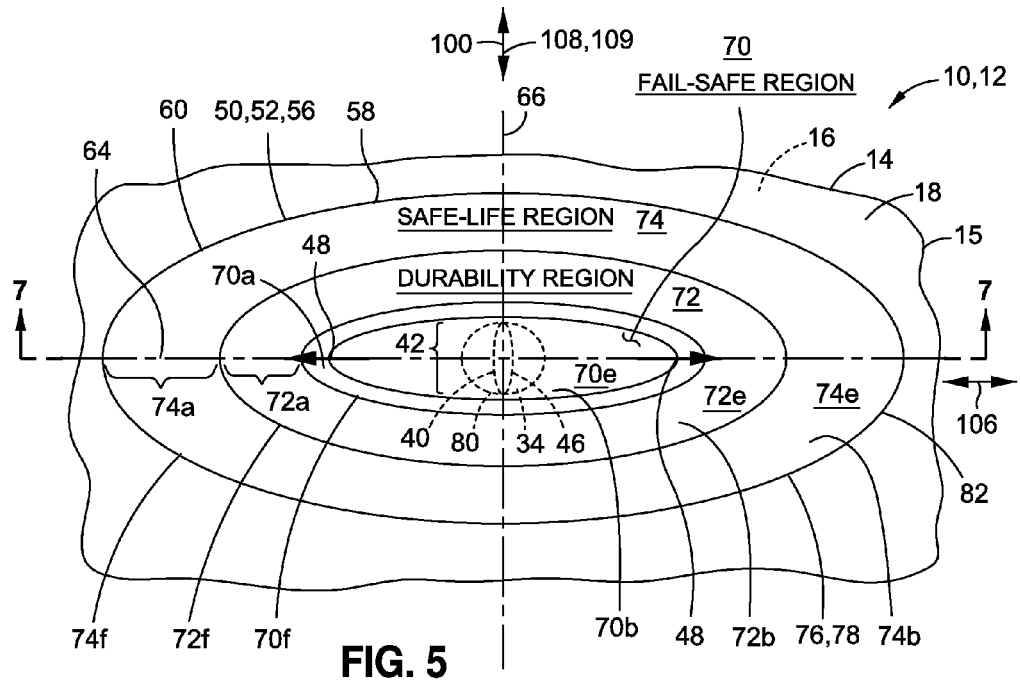
FIG. 5 is a top view illustration of an embodiment of the patch having a fail-safe region, a durability region and a safe-life region.
Figure 6:
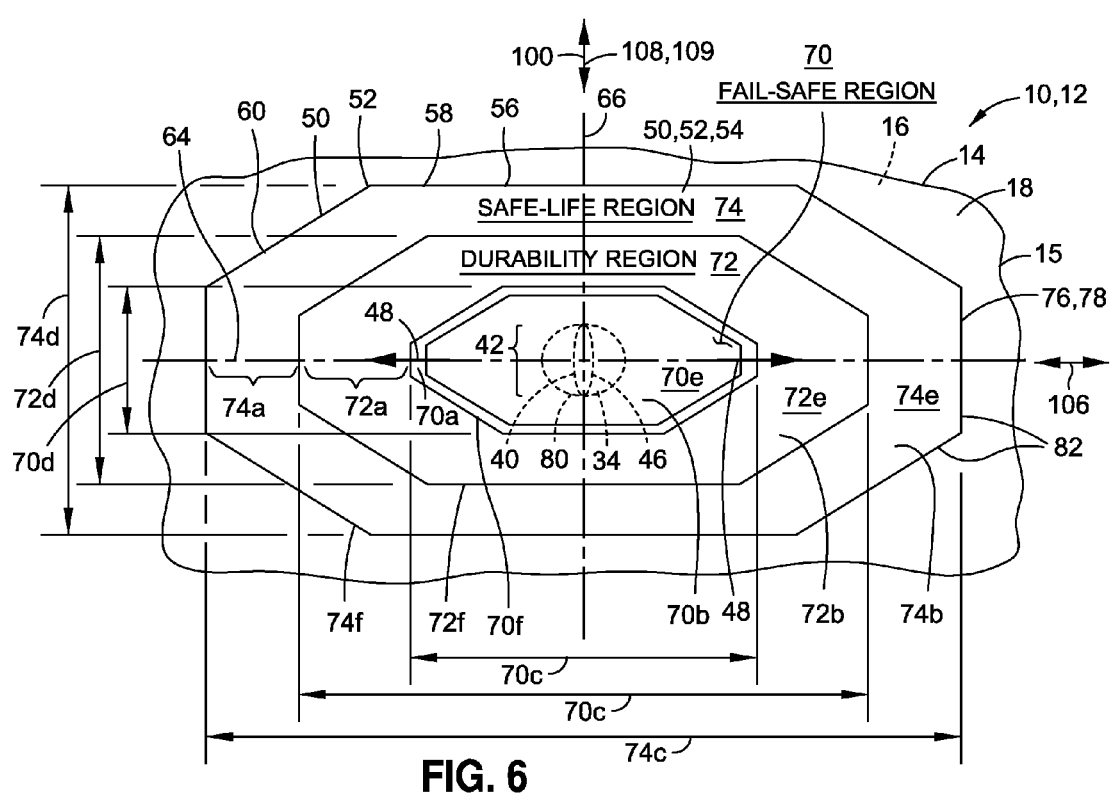
FIG. 6 is a top view illustration of a further embodiment of the patch having an elongated octagonal shape.

Optionally, decreasing taper angles $\theta_{FS}$, $\theta_D$, $\theta_{SL}$ (FIGS. 7-8) along the radially outward direction 48 may be selected for the regions 70, 72, 74 for either the scarfed configuration 54 (FIG. 8) or the doubler configurations 56 (FIG. 7) to distribute interlaminar stress 86 (FIGS. 7-8) from the patch body 52 into the structure 10. In addition, the decreasing taper angles $\theta_{FS}$, $\theta_D$, $\theta_{SL}$ (FIGS. 7-8) may facilitate a reduction in peel stress 82 and/or shear stress 84 in the bondline 76 between the patch body 52 and the structure 10. The taper angles $\theta_{FS}$, $\theta_D$, $\theta_{SL}$ (FIG. 7) may be tailored to the mechanical properties of the structure 10 to which the patch 50 may be bonded. For example, the taper angles $\theta_{FS}$, $\theta_D$, $\theta_{SL}$ (FIGS. 7-8) for each one of the regions 70, 72, 74 may be selected such that the bond strength at an edge 70f, 72f, 74f of each one of the regions 70, 72, 74 is greater than the peel stress 82 and shear stress 84 in the bondline 76 between the patch body 52 and structure 10 at the region edges 70f, 72f, 74f. Such peel and shear stresses 82, 84 may be induced in the bondline 76 by the primary load 108 (FIGS. 5-6) acting on the structure 10 as illustrated in FIGS. 5-6. However, secondary loads (not shown) may contribute to the peel and shear stresses 82, 84 in the bondline 76 to a less significant extent.

For the doubler configuration 56 of the patch body 52 illustrated in FIG. 7, the taper angle $\theta_{SL}$ at the safe-life region 74 (i.e., outermost region) is preferably formed to be relatively shallow to minimize the peel stress 82 at the edge 74f of the safe-life region 74. By providing the safe-life region 74 with a relatively shallow taper angle $\theta_{SL}$, tensile loading (i.e., peel stress 82) in the adhesive 78 may be minimized to take advantage of the relatively high shear capacity of the adhesive 78 as compared to a relatively low tensile capacity of the adhesive 78. The preferably shallow taper angle $\theta_{SL}$ may result in a relatively larger size or area of the patch body 52 as compared to the area of the patch body 52 having a relatively steep taper angle $\theta_{SL}$.

For the scarfed configuration 54 of the patch body 52 illustrated in FIG. 8, the preferably shallow taper angle $\theta_{SL}$ of the safe-life region 74 may be balanced with a preferably minimal amount of material removal from the structure 10 to avoid the risk of compromising the structural integrity of the structure 10 during the material removal and to reduce the complexity and time involved in removing material. Likewise, for the scarfed configuration 54 of the patch body 52, the taper angle $\theta_{SL}$ is preferably relatively shallow at the safe-life region 74 (i.e., outermost region) to minimize peel stress 82 at the edge 74f of the safe-life region 74 as described in greater detail below.

In addition, relatively shallow taper angles $\theta_{FS}$, $\theta_D$, $\theta_{SL}$ (FIGS. 7-8) may provide a means for mitigating crack 40 growth or growth of other types of inconsistencies 46. As indicated above, the patch body 52 is preferably generally configured to reduce peel stresses 82 at the patch edge 58 of the patch 50 to prevent disbonding of the patch 50 at the bondline 76 (FIG. 5) as described in greater detail below.

As can be seen in FIGS. 5-8, shown are regions 70, 72, 74 of the patch body 52 (FIGS. 5-8) which may be respectively comprised of patch plies 70e, 72e, 74e (FIGS. 7-8) arranged in at least one of the three regions comprising the fail-safe region 70, the durability region 72 and the safe-life region 74. The fail-safe region 70 may be sized to encompass the rework area 34. The rework area 34 may include the crack 40 or other out-of-tolerance inconsistency 46 as described above and which may be oriented as illustrated in FIG. 5 or in any other orientation or combination of orientations. For example, the crack 40 may comprise a transverse crack 40 similar to that which is illustrated in FIG. 4 wherein the crack 40 may be generally oriented in an out-of-plane direction relative to adjacent plies 28, 30, 32 (FIG. 4) of the skin 14. However, it is also contemplated that the crack 40 may comprise a longitudinal or in-plane crack or delamination (not shown) that may be oriented in general alignment with the plies 28, 30, 32 (FIG. 4) that make up the composite structure 10. In addition the crack 40 may be oriented in an in-plane direction (not shown) and out-of-plane direction (not shown) relative to adjacent plies 28, 30, 32 (FIG. 4) of the skin 14. The patch 50 may preferably be configured for application to structures affected by transverse cracking such as those which may develop under hoop loads 100 (FIG. 2) and/or shear loads 102 (FIG. 2) in the fuselage structure 10 due to pressurization loads 104 (FIG. 2) as was earlier described. However, the patch 50 may be configured for application to structures affected by other types of inconsistencies 46, without limitation.

Referring to FIGS. 5-7, the fail-safe region 70 may be formed of patch plies 70e and may be sized to encompass or overlap the rework area 34 which may contain the crack 40 or other inconsistency 46. The patch 50 may further include the durability region 72 formed of patch plies 72e and which may encompass or circumscribe the fail-safe region 70. Likewise, the patch body 52 may include the safe-life region 74 formed of patch plies 74e and which may encompass the durability region 72. As can be seen, each one of the regions 70, 72, 74 may preferably be formed in an oblong shape having a long axis 64 oriented substantially perpendicularly relative to the primary load direction 109. It is believed that providing the regions 70, 72, 74 (FIGS. 5-7) in a substantially oblong shape oriented substantially perpendicularly relative to the primary load direction 109 facilitates a favorable stress distribution relative to round-shaped regions (not shown). Furthermore, providing the regions 70, 72, 74 (FIGS. 5-7) in a substantially oblong shape is believed to facilitate reduced peel stress 82 in the bondline 76 at the patch edge 58 as compared to a round shape configuration of the regions 70, 72, 74 (FIGS. 5-7). However, the regions 70, 72, 74 (FIGS. 5-7) of the patch body 52 may be provided in any shape. Furthermore, the regions 70, 72, 74 of the patch body 52 may include dissimilar shapes and may be formed in symmetrical arrangements relative to a short axis 66 or long axis 64 of the patch body 52 as illustrated in FIGS. 5-6. However, the patch body 52 may be provided in non-symmetrical arrangements.

In addition, the patch 50 may be formed in a shape wherein the length of the patch body 52 (FIG. 6) is greater than the width of the patch body 52 (FIG. 6). In this regard, as shown in FIG. 6, each one of the fail-safe 70, durability 72 and safe-life regions 74 may be defined by a length 70c, 72c, 74c and a width 70d, 72d, 74d. In an embodiment as shown in FIG. 6, each one of the regions 70, 72, 74 may have a length to width ratio that is within the range of approximately 2.0 to 4.0. Preferably, the length to width ratio of at least one the regions 70, 72, 74 is approximately 3.0. However, it should be noted that the above-mentioned ratios of the length to width may be provided in any range and are not limited to the specific examples described above.

Referring briefly to FIG. 6, the shape of the patch body 52 for the doubler configuration 56 or the scarfed configuration

54 may comprise a variety of different configurations including, but not limited to, an elongated octagon 62 shape as illustrated in FIG. 6. For the elongated octagon 62 shape, the regions 70, 72, 74 of the patch body 52 may likewise define a corresponding length 70c, 72c, 74c and width 70d, 72d, 74d for each one of the regions 70, 72, 74 which may be similar to the length to width ratios described above with regard to the rounded oblong 60 shape illustrated in FIG. 5. However, the length to width ratios of the regions 70, 72, 74 of the elongated octagon 62 may be provided in any ratio and are not limited by the above-mentioned ratios. For example, the length to width ratios of the patch body 52 may be non-linear wherein the length to width ratio of the fail-safe, durability and safe-life regions 70, 72, 74 may be respectively defined as 4.0, 3.0 and 3.5. In this regard, the length to width ratios of the regions 70, 72, 74 may be provided in any relative values without limitation.

Referring to FIGS. 7-8, the patch 50 may be provided with taper angles $\theta_{FS}, \theta_D, \theta_{SL}$ for each one of the regions 70, 72, 74. In an embodiment, the taper angles $\theta_{FS}, \theta_D, \theta_{SL}$ may be generally decreasing along a radially outward direction 48 in order to distribute interlaminar stress 86 from the patch body 52 to the structure 10. However, the taper angles $\theta_{FS}, \theta_D, \theta_{SL}$ may be provided in any arrangement on the regions 70, 72, 74 to facilitate a gradual reduction in the interlaminar stress 86 within the structure 10 along the radially outward direction 48. For example, the fail-safe region 70, in an embodiment, may include a scarf 70a having a taper angle $\theta_{FS}$ that may be within the range of from approximately 10:1 to 30:1 and, more preferably, the taper angle $\theta_{FS}$ for the fail-safe region 70 may be approximately 20:1. In addition, the fail-safe region 70 may be formed of patch plies 70e that provide the fail-safe region 70 with a mode I interlaminar fracture toughness 70b of between approximately 2.5 to 7.0 in-lb/in$^2$.

Preferably, the interlaminar fracture toughness 70b of the fail-safe region 70 is approximately 3.0 in-lb/in$^2$ which may advantageously minimize stresses in the adhesive 78 bonding the patch 50 to the structure 10. More particularly, the taper angle $\theta_{FS}$ at which the scarf 70a of the fail-safe region 70 may be formed may minimize stresses in the adhesive 78 at the patch edge 58 of the patch 50 as described above. In this manner, the fail-safe region 70 of the patch body 52 may facilitate containment of the crack 40 with a relatively low probability of extension or propagation of the crack 40 to the durability region 72. Regarding ply orientation, for the scarfed configuration 54 of the patch body 52 as illustrated in FIG. 8, the patch plies 70e, 72e, 74e may have the same stacking sequence and orientation of the plies 15 that make up the structure 10 in order to maintain continuity of load paths between the plies 15 in the structure 10 and the patch plies 70e, 72e, 74e in the patch body 52. For the doubler configuration 56 of the patch body 52 as illustrated in FIG. 7, the patch plies 70e, 72e, 74e may mirror the stacking sequence and orientation of the plies 15 that make up the structure 10. However, the patch plies 70e, 72e, 74e for the scarfed configuration 54 and the doubler configuration 56 may be provided in any stacking sequence and in any orientation without limitation. For example, the stacking sequence and orientation of the patch plies 70e, 72e, 74e may be different than the stacking sequence and orientation of the plies 15 that make up the structure 10.

Referring still to FIG. 7-8, the patch body 52 may include the durability region 72 which may encompass the fail-safe region 70. In an embodiment, the durability region 72 may be sized such that an edge 72f of the durability region 72 is located approximately midway between the edge 70f of the fail-safe and the edge 74f of the safe-life region 74 as shown in FIGS. 7-8. Likewise the mode I interlaminar fracture toughness 72b and taper angle $\theta_D$ of the durability region 72 may be selected to fall approximately midway between the mode I interlaminar fracture toughness 70b, 74b values and taper angle values $\theta_{FS}, \theta_{SL}$ of the fail-safe and safe-life regions 70, 74 located on opposing sides of the durability region 72. However, the durability region 72 may be provided in any size relative to the fail-safe and safe-life regions 70, 74. The durability region 72 may be formed with a taper angle $\theta_D$ on the scarf 72a of between approximately 20:1 and 40:1 and, more preferably, at a taper angle $\theta_D$ of approximately 30:1. In addition, the durability region 72 may be formed of composite materials providing a mode I interlaminar fracture toughness 72b of between approximately 2.0 to 5.0 in-lb/in$^2$ and, more preferably, approximately 2.5 in-lb/in$^2$. Advantageously, the combination of the taper angle $\theta_{FS}$ and the mode I interlaminar fracture toughness 72b with which the durability region 72 is formed may reduce the interlaminar stress 86 and minimize crack 40 propagation.

The patch body 52 may further include the safe-life region 74 which may encompass the durability region 72 and which may have a scarf 74a formed at a taper angle $\theta_{SL}$ that may be within the range of from approximately 35:1 to 55:1 and, more preferably, at a taper angle $\theta_{SL}$ of approximately 45:1. Furthermore, the safe-life region 74 may be formed of composite materials providing a mode I interlaminar fracture toughness 74b within the safe-life region 74 of approximately 1.5 to 3.5 in-lb/in$^2$ and, more preferably, approximately 2.0 in-lb/in$^2$. Advantageously, the relatively shallow taper angle $\theta_{SL}$ at which the scarf 74a of the safe-life region 74 is formed may reduce stress concentrations at the patch edge 58 of the patch 50 for configurations of the composite material having a Poisson's ratio of approximately 0.5. In this regard, the safe-life region 74 provides a means for reducing shear and peel stresses 84, 82 in the adhesive 78 bonding the patch 50 to the structure 10.

As can be seen in FIGS. 7 and 8, the patch body 52 may be provided in a scarfed configuration 54 (FIG. 8), a doubler configuration 56 (FIG. 7) or any combination thereof or any other suitable configuration. In the scarfed configuration 54 shown in FIG. 8, the patch body 52 may be mounted within the structure 10 in inverted orientation relative to the orientation of the patch body 52 in the doubler configuration 56 as shown in FIG. 7. It should also be noted that in FIGS. 7-8, the thickness of the patch plies 70e, 72e, 74e and structure 10 plies 15 are exaggerated for illustration purposes only. In a non-limiting example, the patch plies 70e, 72e, 74e (FIGS. 7-8) and structure 10 plies 15 (FIG. 4) may have a thickness of approximately 0.007 inch. For a structure 10 such as a skin 14 having thirty (30) of the patch plies 15, the total thickness of the skin 14 may be less than 0.21 inch. Material may be removed from the structure 10 containing an inconsistency 46 to a depth of less than 0.15 inch. A patch body 52 may be prepared having a thickness approximately equal to the thickness (e.g., 0.15 inch) of the material that may be removed from the structure 10. Likewise, the patch body 52 in the doubler configuration 56 as shown in FIG. 7 may have a thickness of approximately 0.15 inch for mounting to a skin 14 have an inconsistency 46 formed at a depth of 0.21 inch or any other suitable depth. However, the patch body 52 may be provided in any thickness is not limited by the depth of the material removed from the structure or by the overall thickness of the skin 10.

As can be seen in FIG. 7, the patch body 52 may be mounted to the structure 10 in the doubler configuration 56 wherein the patch body 52 is mounted to the outer mold line 18 of the skin 14 and may be substantially centered over the rework area 34 which may contain a crack 40 or other inconsistency 46 as was described above and as illustrated in FIG. 5. Optionally, the patch 50 may be configured in the scarfed configuration 54 wherein the skin 14 may be prepared for receiving the patch 50 by removal of material which may contain the crack 40 or other inconsistency 46 in the rework area 34. In addition, the boundary 36 of the rework area 34 may have a scarf 38 that may be formed complementary to the individual taper angle $\theta_{FS}$, $\theta_D$, $\theta_{SL}$ of respective ones of the regions 70, 72, 74 in order to provide complementary fit of the patch 50 to the rework area 34.

The combination of the oblong shape, the taper angle $\theta_{FS}$, $\theta_D$, $\theta_{SL}$ and the respective mode I interlaminar fracture toughness 70b, 72b, 74b values for each region 70, 72, 74 may facilitate a reduction or elimination of relatively high stresses at the patch edge 58 of the patch body 52 when bonded to the structure 10. Further in this regard, the geometric configuration and mechanical properties of each of the regions 70, 72, 74 may result in a robust bondline 76 (FIG. 8) between the patch 50 and structure 10 to resist unzipping or peeling of the patch body 52 away from the structure 10 which may initiate as edge peel. As indicated above, the taper angle $\theta_{FS}$, $\theta_D$, $\theta_{SL}$ of at least one of the regions 70, 72, 74 (FIGS. 5-7) may be selected such that the bond strength at an edge 70f, 72f, 74f of at least one of the regions 70, 72, 74 (FIGS. 5-7) is greater than the shear stress 84 and/or the peel stress 82 in the bondline 76. The regions 70, 72, 74 that make up the patch body 52 are preferably configured to be complementary to the adhesive 78 stresses in the bondline 76 in order to contain and resist growth of the crack 40 within the rework area 34. In this regard, selection of the taper angle $\theta_{FS}$, $\theta_D$, $\theta_{SL}$ and the interlaminar fracture toughness 70b, 72b, 74b values may include a consideration of factors including, but not limited to, the location of the crack 40 within the rework area 34 and the type of crack 40 or fracture, the interlaminar fracture toughness of the structure 10, peel and shear stress 82, 84 characteristics of the patch 50 relative to the structure 10 as well as the local load attraction and shear properties of the structure 10.

Referring to FIGS. 5-6, the patch body 52 may preferably be oriented relative to the direction of load such as the primary load 108 acting thereupon. For example, the oblong shape of each one of the regions 70, 72, 74 may define a long axis 64. The patch 50 may be installed on the structure 10 such that the long axis 64 is oriented substantially perpendicularly relative to the primary load direction 109 which may comprise any type of load. For example, the load may comprise a hoop load 100 to which the structure 10 may be subjected. In addition, as shown in FIGS. 5 and 6, the crack 40 may define a crack length 42. The patch 50 may define an oblong shape having the long axis 64 oriented substantially perpendicularly relative to the crack length 42. Furthermore, the patch body 52 may be sized and configured based upon the magnitude of the loads which may be imposed on the structure 10. The patch body 52 may be sized and configured such that the combination of the structure 10 with patch body 52 bonded thereto may be capable of handling loads of up to and/or beyond approximately 150% of the in-service limit load to which the original structure 10 is designed without deformation of the structure 10. As is known in the art, limit load is the maximum load for which a structure may be configured to carry without plastic deformation (i.e., permanent deformation).

In this regard, the sizing of the patch body 52 may be in consideration of the engineering requirements of the structure 10 such as the load carrying capability of the structure 10. For example, the patch body 52 may be configured such that when bonded to the structure 10, the structure 10 retains the required residual strength following exposure to operational hazards. The patch body 52 may be configured such that the structure 10 retains residual strength within a period of use prior to reworking the structure 10. Such period of use may comprise pre-designated inspection and rework intervals for the structure 10 as part of the regular service of the structure 10.

Referring still to FIGS. 5-6, the fail-safe region 70 of the patch body 52 is preferably sized and configured such that when bonded to the structure 10, the structure 10 meets federally-mandated airworthiness requirements regarding the capability of the structure 10 to sustain such exposure to operational hazards without loss of the load carrying capability of the structure 10. The durability region 72 may be configured such that when the patch 50 is bonded to the structure 10, any disbond 80 in the adhesive 78 bonding the patch 50 to the structure 10 within the durability region 72 may be in accordance with predicted growth in the disbond 80 and which may represent a linear or non-linear rate of disbond 80 growth between the patch 50 and the structure 10. In this regard, the durability region 72 may be configured such that any increase in a disbond 80 due to fatigue corresponding to the design service life of the structure 10 may be predicted. Likewise, the safe-life region 74 may be configured such that when the patch 50 is bonded to the structure 10, any stresses within the adhesive 78 bonding the patch 50 to the structure 10 and particularly at the patch edge 58 of the patch 50 are maintained below a level which prevents growth in the crack 40 located within the rework area 34. In this regard, the safe-life region 74 is preferably configured to minimize in-plane shear and peeling moments within the adhesive 78 bonding the patch 50 to the structure 10.

Further in this regard, each one of the regions 70, 72, 74 may be configured to have a ply 70e, 72e, 74e stacking sequence and/or ply 70e, 72e, 74e orientation which may be based in part upon the magnitude and/or direction of the load that may be applied to the structure 10. As indicated above, the patch body 52 may be configured to have a relative proportion of plies 70e, 72e, 74e that may be tailored complementary to the structure 10 to which the patch 50 is bonded. Although not shown, the relative proportion of plies 70e, 72e, 74e may comprise a ratio of approximately 44%, 40% and 16%, respectively of 0°, ±45° and 90° plies 28, 30, 32 relative to a primary load direction 109 although the patch body 52 may be provided with any suitable relative proportion of 0°, ±45° and 90° plies 28, 30, 32 or any other ply orientations. Furthermore, although not shown, the stacking sequence may be provided in a balanced layup where there may be a substantially equal number of negative plies such as −45° plies as there are +45° plies. However, the stacking sequence may be provided in an unbalanced layup (not shown) having a substantially unequal number of patch plies of positive and negative orientation. In this same regard, the patch 50 may be formed complementary to the structure 10 in consideration of the loading on the structure 10 and/or the mechanical properties of the structure 10. As indicated above, the patch body 52 may be formed of toughened carbon-epoxy composite material or any other suitable composite material.

Figure 9:
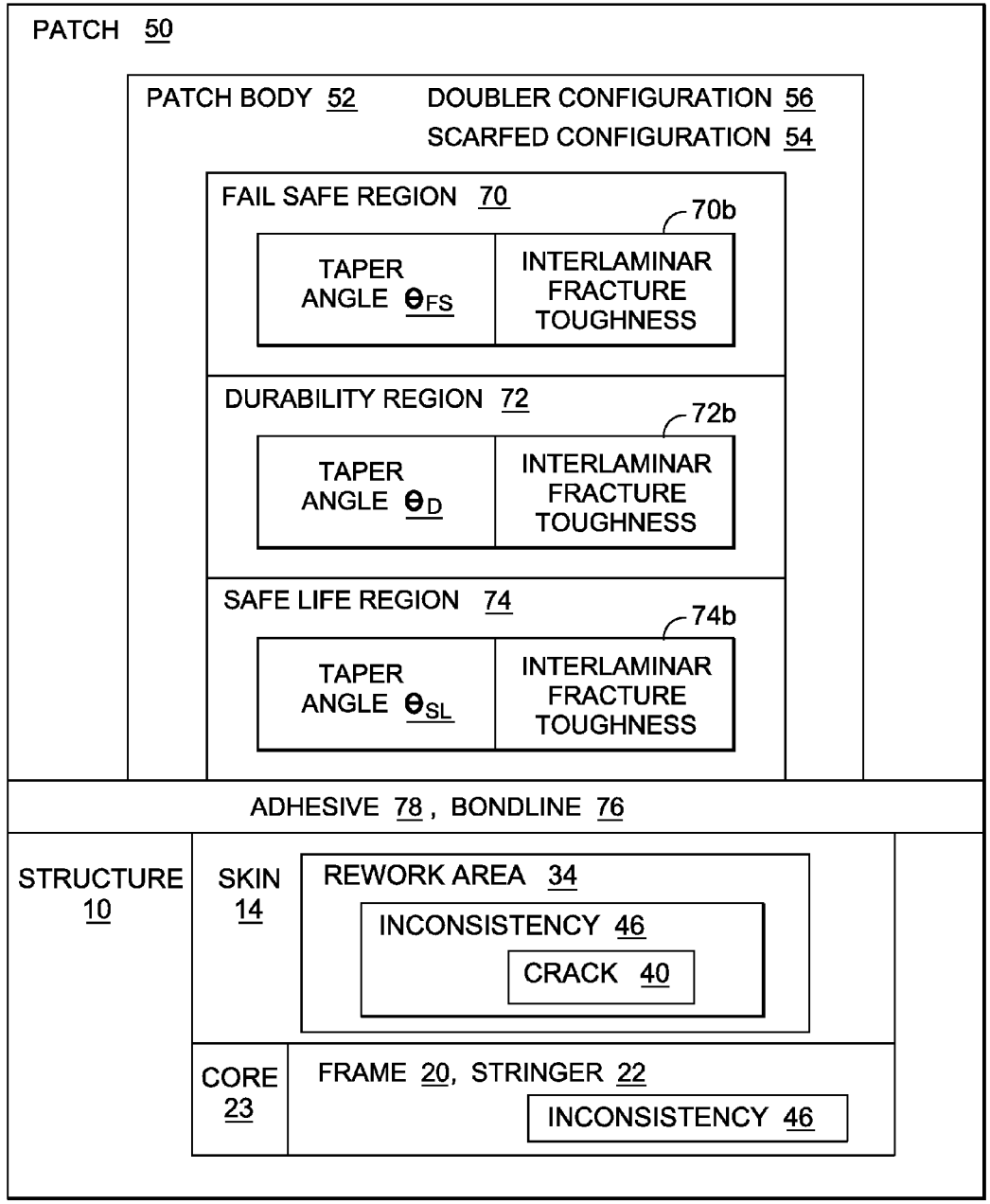
FIG. 9 is a block diagram of the patch.

Referring briefly to FIG. 9, shown is a block diagram illustrating a structure 10 to which a patch body 52 may be mounted to a skin 14. The patch body 52 may be formed in the scarfed configuration 54 and/or the doubler configuration

56. The patch body 52 may be bonded to the structure 10 although the present disclosure discloses alternative means for mounting the patch 50 to the structure 10 including, without limitation, mechanical fastening. As can be seen in FIG. 9, the structure 10 may comprise the patch 50 which may include the patch body 52 having at least one of the three regions 70, 72, 74 described above. For example, the patch body 52 may include the fail-safe region 70, the durability region 72 and the safe-life region 74. Each one of the regions 70, 72, 74 may include a respective scarf 70a, 72a, 74a having a respective taper angle $\theta_{FS}$, $\theta_D$, $\theta_{SL}$ formed at the above-described ranges.

Advantageously, decreasing taper angles $\theta_{FS}$, $\theta_D$, $\theta_{SL}$ (FIGS. 5-8) in the patch body 52 along the radially outward direction 98 (FIGS. 5-8) may facilitate a reduction in peel stress 82 (FIGS. 5-8) and/or shear stress 84 (FIGS. 5-8) in an adhesive 78 bondline 76 between the patch body 52 and the structure 10 at each one of the regions 70, 72, 74. In this regard, the taper angle $\theta_{FS}$, $\theta_D$, $\theta_{SL}$ (FIGS. 5-8) may be selected for each one of the regions 70, 72, 74 such that the bond strength at an edge 70f, 72f, 74f of each one of the regions 70, 72, 74 is greater than the shear stress 84 (FIGS. 7-8) and peel stress 82 (FIGS. 7-8) in the bondline 76 at the regions 70, 72, 74 as indicated above. Furthermore, for the scarfed configuration 54, the decreasing taper angles $\theta_{FS}$, $\theta_D$, $\theta_{SL}$ (FIGS. 5-8) in each one of the regions 70, 72, 74 along the radially outward direction 98 (FIGS. 5-8) may facilitate a reduction in total amount of material required to be removed from the structure 10 as compared to a patch body 52 formed with a single relatively shallow taper along the entire length of the patch body 52. For both of the scarfed and the doubler continuations 54, 56, the decreasing taper angles $\theta_{FS}$, $\theta_D$, $\theta_{SL}$ (FIGS. 5-8) along a radially outward direction 98 (FIGS. 5-8) may facilitate a reduction in the stress in the bondline 76 between the patch body 52 and the structure 10.

In addition, each one of the regions 70, 72, 74 may be formed of composite material having a respective desired mode I interlaminar fracture toughness 70b, 72b, 74b as was described above. The patch body 52 may be bonded to the structure 10 in order to form a bondline 76 which may be configured complementary to the mechanical properties of the patch 50 and the structure 10. In this regard, the patch 50 may be bonded to the skin 14 which may include the rework area 34 having an inconsistency 46 such as a crack 40, porosity (not shown), a delamination (not shown) or any other inconsistency 46. The skin 14 may include a frame 20 and/or stringer 22 which may be mounted to the skin 14 similar to that which is described and illustrated in FIGS. 2 and 3. Although specific examples are not shown, the patch body 52 may optionally be bonded to a structure 10 having skin 14 mounted to at least one side of a core 23 of a sandwich structure (not shown). In other examples not shown, the patch body 52 may be bonded to a frame 20, a stringer 22 or to any other element having any type of inconsistency 46.

Figure 10:
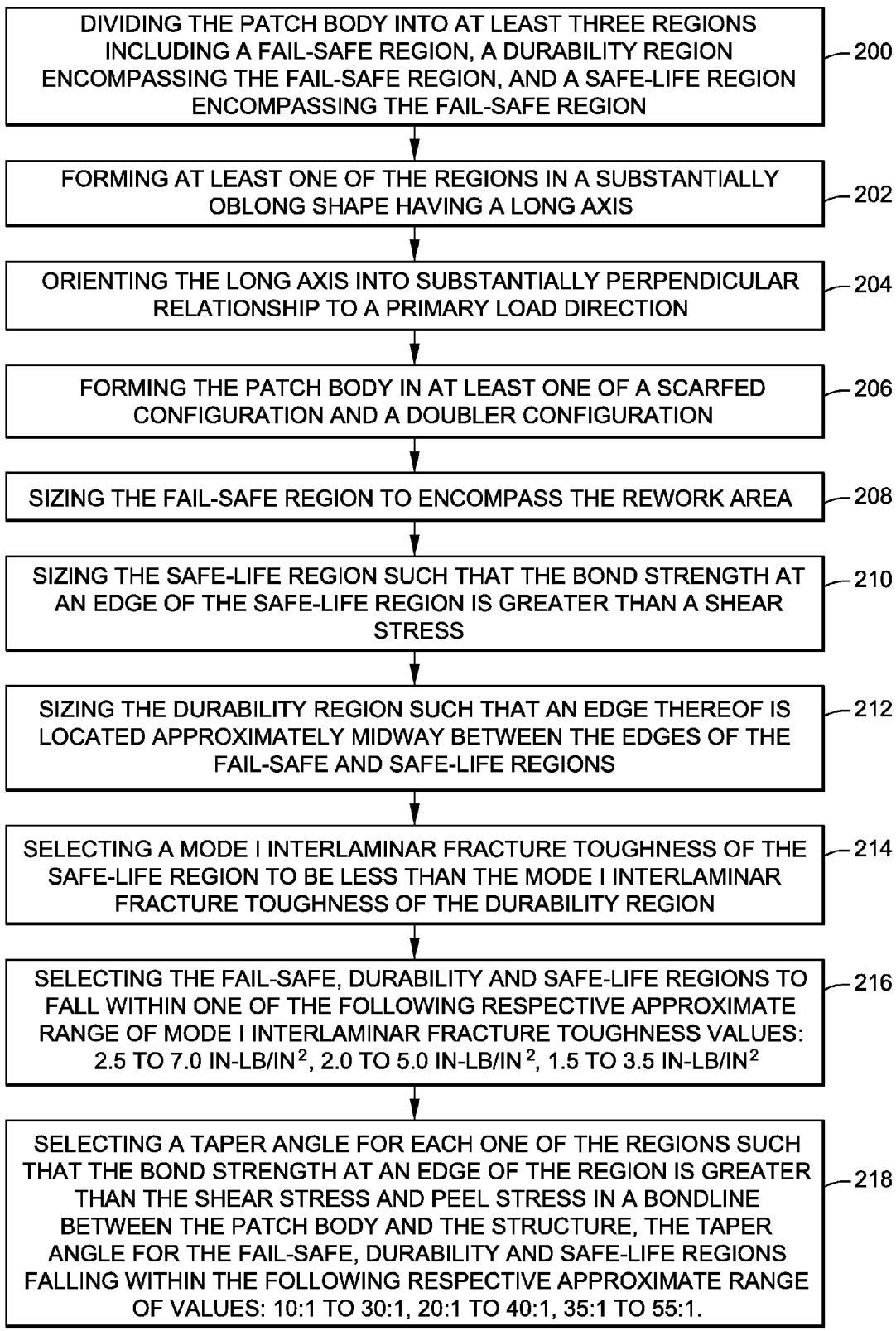
FIG. 10 is an illustration of a flow diagram for a methodology of reworking a composite structure.

Referring now to FIG. 10 and with additional reference to FIGS. 1-8, shown in FIG. 10 is a flow diagram illustrating a methodology for configuring the patch body 52 (FIGS. 5-8) such as may be bonded to the structure 10 (FIGS. 1-8). As was earlier indicated, the structure 10 (FIGS. 1-8) may include the rework area 34 (FIGS. 1-8) which may contain an inconsistency 46 (FIGS. 2-3, 5-8) such as a transverse crack 40 or any other type of inconsistency 46 without limitation. The patch body 52 (FIGS. 5-8) may be bonded to the structure 10 in order to restore the mechanical properties of the structure 10. The structure 10 may be subject to a load such as, without limitation, a primary load 108 (FIGS. 2-3, 5-6) which may be imposed on the structure 10.

For example, as indicated above with regard to FIGS. 2 and 3, the primary load 108 (FIG. 2, 5-6) may comprise hoop loads 100 that may result from pressurization loads 104 (FIG. 3) acting on the inner mold line 16 (FIG. 2) of the skin 14. Such primary loads 108 (FIG. 2) may induce interlaminar stress 86 (FIGS. 7-8) in the structure 10 as may occur between patch plies 28, 30, 32 (FIG. 4) of the structure 10 as shown in FIG. 4. The structure 10 may also be subject to secondary loads (not shown) which may induce stresses in the structure 10 and/or which may contribute to interlaminar stress 86 (FIGS. 7-8) but to a less significant extent than primary loads 108 (FIG. 2, 5-6). The primary loads 108 may also induce peel stress 82 (FIGS. 7-8) and/or shear stress 84 (FIGS. 7-8) in the bondline 76 (FIGS. 7-8) between the structure 10 and the patch body 52 such as is shown in FIG. 7-8. As indicated above, such peel stress 82 may tend to peel the patch edge 58 of the patch away from the structure 10. Such loads may be characterized by analysis and/or testing of the structure 10 or by any other suitable means in order to determine the magnitude and/or direction of such loads including primary loads 108 acting on the structure 10.

In addition, the character and/or geometry of the inconsistency 46 may be determined such as by non-destructive inspection using any suitable means including, but not limited to, ultrasonic testing, infrared testing, acoustic testing radio shearography and/or any other testing technique for identifying and/or characterizing an inconsistency 46 such as a crack 40 for determining the size, shape, and type thereof. For example, a geometry of the rework area 34 (FIG. 7) may be determined including determining a geometry of the crack 40 (FIG. 7). As shown in FIG. 5, the crack 40 or other inconsistency 46 (FIG. 5) may include a crack 40 depth (FIG. 7) and/or crack length 42 and may further define a crack 40 direction. In addition, the crack 40 or other inconsistency 46 (FIG. 5) may be formed in any one of a variety of modalities including, but not limited to, a transverse crack 40 and/or a longitudinal crack 40 which may be oriented relative to the primary load direction 109 (FIGS. 5-6).

Referring still to FIG. 10 with additional reference to FIGS. 1-8, step 200 of FIG. 10 may comprise dividing the patch body 52 (FIG. 2, 5-8) into the regions which may include the fail-safe region 70, the durability region 72 and the safe-life region 74 as shown in FIGS. 5-8. However, the patch body 52 may be divided into two regions comprising the fail-safe region 70 (i.e., innermost region) and the safe-life region 74 (i.e., outermost region) which may encompass the fail-safe region 70. Furthermore, the patch body 52 may be divided into more than three regions. Advantageously, the patch 50 (FIGS. 1-3, 5-8) may be configured such that the mode I interlaminar fracture toughness 74b (FIGS. 5-8) of the safe-life region 74 (i.e., the outermost region of the patch body 52) is preferably less than the mode I interlaminar fracture toughness 72b (FIGS. 5-8) of the fail-safe region 72.

For the patch body 52 having three regions comprising the fail-safe region 70, a durability region 72 and a safe-life region 74, the mode I interlaminar fracture toughness 74b (FIGS. 5-8) of the safe-life region 74 (i.e., the outermost region of the patch body 52) may be less than the mode I interlaminar fracture toughness 72b (FIGS. 5-8) of the durability region 72 in order to reduce local stiffness of the patch body 52 at the patch edge 58. In this manner, the reduced mode I interlaminar fracture toughness 74b (FIGS. 5-8) at the fail-safe region 70 may substantially retard or minimize the potential for propagation of the inconsistency 46 such as the crack 40 through the structure 10. In addition, by generally decreasing the mode I interlaminar fracture toughness of the regions 70, 72, 74 (FIGS. 5-8) along a radially outward direction 98 (FIGS. 5-8) of the patch body 52, propagation of the crack 40 (FIGS. 5-6) or other inconsistency 46 (FIGS. 5-6) within the structure 10 may be arrested. In this manner, undesirable effects of the inconsistency 46 may be mitigated and stresses resulting from the inconsistency 46 may be redistributed to a larger area of the structure 10.

As was earlier indicated, the safe-life region 74 (FIGS. 5-8) may encompass the rework area 34 (FIGS. 5-8) within which the crack 40 or inconsistency 46 may be contained. The durability region 72 may encompass the fail-safe region 70. The safe-life region 74 may encompass the durability region 72 as illustrated in FIGS. 5 and 6. Step 202 may comprise forming at least one of the regions 70, 72, 74 in a substantially oblong shape having a long axis 64 and a short axis 66 as illustrated in FIGS. 5-6. In the oblong configuration, the patch 50 has a length 70c, 72c, 74c (FIG. 6) that may be greater than the respective width 70d, 72d, 74d (FIG. 6) and which may be sized at any one of a desired set of ratios as was described above. For example, one or more of the regions 70, 72, 74 (FIG. 6) may be sized to have a length to width ratio of between approximately 2.0 and approximately 4.0 and, preferably, approximately 3.0 although the patch 50 may have any length to width ratio. As shown in FIG. 5-6, the patch 50 may be formed in a rounded oblong 60 (FIG. 5) shape and/or an elongated octagonal 62 (FIG. 5) shape or any other suitable shape which may be applied to any one of the regions 70, 72, 74 (FIG. 5-6) in any proportion. The oblong shape of the regions 70, 72, 74 may define a long axis 64 and a short axis 66 wherein the long axis 64 of the patch 50 may be oriented generally perpendicularly relative to the primary load direction 109 (FIG. 5-6) although the patch 50 may be installed at any orientation relative to the primary load direction 109 (FIG. 5-6).

Step 204 may comprise orienting the long axis 64 (FIG. 5-6) substantially perpendicularly relative to the primary load direction 109 (FIG. 5-6). As is indicated above, providing one or more of the regions 70, 72, 74 (FIG. 5-8) in a substantially oblong shape oriented substantially perpendicularly relative to the primary load direction 109 facilitates a favorable stress distribution in the patch body 52 relative to the stress distribution of round-shaped regions. In this regard, the oblong shape of the patch body 52 may minimize or eliminate the occurrence of peak stresses (not shown) in the structure 10. Furthermore, providing the regions 70, 72, 74 (FIG. 5-8) in a substantially oblong shape is believed to reduce stress in the bondline 76 and peel stress 82 at the patch edge 58 as compared to a round-shaped configuration of the regions 70, 72, 74 (FIG. 5-8). Although shown in an oblong shape, the regions 70, 72, 74 (FIG. 5-8) of the patch body 52 may be provided in any shape without limitation. Furthermore, the regions 70, 72, 74 of the patch body 52 may include dissimilar shapes and may be formed in symmetrical arrangements relative to a short axis 66 (FIGS. 5-6) or long axis 64 (FIGS. 5-6) of the patch body 52 as illustrated in FIGS. 5-6. However, the patch body 52 may optionally be provided in non-symmetrical arrangements (not shown).

Step 206 may comprise forming the patch body 52 in a scarfed configuration 54 (FIG. 8) and/or in a doubler configuration (FIG. 7). As shown in FIG. 7, the patch body 52 in the doubler configuration 56 may be applied to the outer mold line 18 of the skin 14 although the patch body 52 in the doubler configuration 56 may be applied to the inner mold line 16 of the skin 14 (not shown). As shown in FIG. 8 the patch body 52 may optionally be formed in the scarfed configuration 54 and may be applied to the skin 14 after removal of material encompassing the rework area 34 containing the inconsistency 46. The patch body 52 in the scarfed configuration 54 may be applied to the skin 14 from the outer mold line 18 side as shown in FIG. 8, from the inner mold line 16 side (not shown) or in any combination such as on both outer and inner mold lines 18, 16. Furthermore, although not shown, the patch body 52 may be formed as a combination of the doubler configuration 56 and the scarfed configuration 54. The patch body 52 in the doubler configuration 56 and/or the scarfed configuration 54 may be applied to any structure 10 having any size, shape and configuration and is not limited to application to a skin 14. For example, although specific examples are not shown, the patch body 52 may be applied to any skin, stringer, frame, or any other structural arrangement, without limitation.

Step 208 may comprise sizing the fail-safe region 70 (FIGS. 5-8) to encompass the rework area 34 (FIGS. 5-8). For example, as shown in FIGS. 5-6, the fail safe region 70 is sized such that the crack or other inconsistency 46 is contained within the fail-safe region 70. For the doubler configuration 56 of the patch body 52 illustrated in FIG. 7, the patch body 52 may be bonded to the structure 10 such that the fail safe region 70 at least covers the inconsistency 46 or rework area 34 to minimize stress concentrations in the inconsistency 46 and thereby minimize propagation of the inconsistency 46. For example, as indicated above, the fail-safe region 70 (FIGS. 5-8) may be provided with a mode I interlaminar fracture toughness 70b (FIGS. 5-8) that is preferably greater than the interlaminar stress 86 (FIGS. 7-8) within the structure 10 in order to minimize crack 40 (FIGS. 5-6) propagation within the structure 10. In the scarfed configuration 54 of the patch body 52 illustrated in FIG. 8, material containing the crack 40 or other inconsistency 46 may be removed from the structure 10. The fail-safe region 70 may be sized such that once installed within the structure 10, the fail-safe region 70 occupies the area formerly containing the crack or inconsistency 46.

In step 210 and referring to FIGS. 7-8, the safe-life region 74 may be sized such that the bondline 76 strength at an edge 74f of the safe-life region 74 is greater than the shear stress 84 in the bondline 76 between the patch body 52 and structure 10 at the edge 74f. As was earlier indicated, loads in the structure 10 such as primary loads 108 may include shear stress 84 in the adhesive 78 bonding the patch body 52 to the structure 10. The safe-life region 74 may be sized such that the length of the edge 74f of the region results in a decrease per unit length along which shear stress 84 may be transferred between the patch 50 and the structure 10. In this manner, the safe-life region 74 may be sized such that the shear stress 84 in the bondline 76 between the patch body 52 and structure 10 at the edge 74f is less than the strength of the adhesive 78 bonding the patch body 52 to the structure 10.

Step 212 may comprise sizing the durability region 72 such that an edge 72f of the durability region 72 is located approximately midway between the edges 70f, 74f of the fail-safe region 70 and safe-life region 74 as is illustrated in FIGS. 5-8. In this manner, the patch body 52 facilitates a gradual reduction in interlaminar stress 86 along a radially outward direction 98. However, the durability region 72 may be sized such that the location of the edge 72f may be biased toward one of the fail-safe region 70 and safe-life region 74 as may be desired for the loading condition to which the structure 10 may be subjected.

Referring still to FIG. 10 and FIGS. 5-8, step 214 may comprise selecting a mode I interlaminar fracture toughness 74b of the safe-life region 74 to be less than the mode I interlaminar fracture toughness 72b of the durability region 72 or less than the region nearest the safe-life region 74 in order to minimize propagation of a discontinuity 46 through the structure 10. Step 216 may comprise selecting or configuring the fail-safe region 70 to have a mode I interlaminar fracture toughness 70b within the approximate range of from 2.5 to 7.0 in-lb/in². Likewise, the durability region 72 may be configured to have a mode I interlaminar fracture toughness 72b within the approximate range of from 2.0 to 5.0 in-lb/in². The safe-life region 74 may be configured to have a mode I interlaminar fracture toughness 74b within the approximate range of from 1.5 to 3.5 in-lb/in². The values may overlap and may be selected to provide a gradual reduction in interlaminar stress 86 (FIGS. 7-8) in the structure 10 in such a manner to minimize or prevent the propagation of a crack 40 or other discontinuity 46 through the structure 10. However, each one of the regions 70, 72, 74 may be provided with any suitable mode I interlaminar fracture toughness value and which is preferably greater than the interlaminar stress 86 to which such regions 70, 72, 74 (FIGS. 5-7) and/or structure 10 may be subjected.

As indicated above and with reference to FIG. 10 and FIGS. 7-8, the interlaminar fracture toughness 70b, 72b, 74b that is selected for each one of the respective regions 70, 72, 74 is preferably such that propagation of the crack 40 or other inconsistency 46 in the structure 10 is minimized. In addition, the mode I interlaminar fracture toughness 70b, 72b, 74b is preferably selected such that the integrity of the bondline 76 adhering the patch 50 to the structure 10 is maintained and the shear stresses 84 and peel stresses 82 at the patch edge 58 are minimized. Further in this regard, it is contemplated that the composite material from which the patch body 52 is formed is selected has an appropriate modulus of elasticity. For example, the regions 70, 72, 74 may be selected to have an intermediate modulus of elasticity such as up to approximately 20 Msi (million psi). However, any one of the regions 70, 72, 74 may be formed of a composite material having a relatively high modulus of elasticity such as up to approximately 25 Msi or at any other suitable modulus of elasticity.

The patch body 52 (FIGS. 5-6) may be bonded to the structure 10 such that the long axis 64 (FIGS. 5-6) of at least one of the regions 70, 72, 74 (FIGS. 5-6) is oriented substantially perpendicularly relative to the primary load direction 109 as indicated above with regard to step 204. For example, as illustrated in FIG. 5, the oblong patch 50 may be mounted in a manner to react hoop loads 106 (FIG. 2) which may be imposed on the skin 14 as a result of pressurization of the interior of the fuselage 122 (FIGS. 2-3). By orienting the patch 50 perpendicularly relative to the primary load direction 109 (FIGS. 5-6), the patch 50 distributes the load away from the crack 40 in order to prevent propagation of the crack. Furthermore, the orientation of the patch 50 as illustrated in FIG. 5 may minimize peel stresses 82 at the patch edge 58 of the patch body 52.

In step 218 and referring to FIGS. 7-8, taper angles $\theta_{FS}$, $\theta_D$, $\theta_{SL}$ may optionally be selected for one or more of the regions 70, 72, 74. In this regard, step 218 may include decreasing the taper angles $\theta_{FS}$, $\theta_D$, $\theta_{SL}$ for each one of the regions 70, 72, 74 along a radially outward direction 48 in order to distribute interlaminar stress 86 from the patch body 52 to the structure 10 as described in greater detail below.

The taper angles $\theta_{FS}$, $\theta_D$, $\theta_{SL}$ for each one of the regions 70, 72, 74 may preferably be selected such that the bond strength at an edge 70f, 72f, 74f of each one of the regions 70, 72, 74 is greater than the peel stress 82 and shear stress 84 in the bondline 76 between the patch body 52 and structure 10 at the region edges 70f, 72f, 74f.

As indicated above, such peel and shear stresses 82, 84 may be induced in the bondline 76 by the primary load 108 (FIGS. 5-6) and/or secondary load (not shown) acting on the structure 10. In a non-limiting example of an embodiment of the patch body 52, the fail-safe region 70 may include a scarf 70a for which the taper angle $\theta_{FS}$ may be selected to be within the range of from approximately 10:1 to 30:1 and, more preferably, approximately 20:1. The durability region 72 may include the scarf 72a which may be formed with the taper angle $\theta_D$ of between approximately 20:1 and 40:1 and, more preferably, approximately 30:1. The safe-life region 74 may have a scarf 74a for which the taper angle $\theta_{SL}$ may be selected to be within the range of from approximately 35:1 to 55:1 and, more preferably, approximately 45:1.

Figure 11:
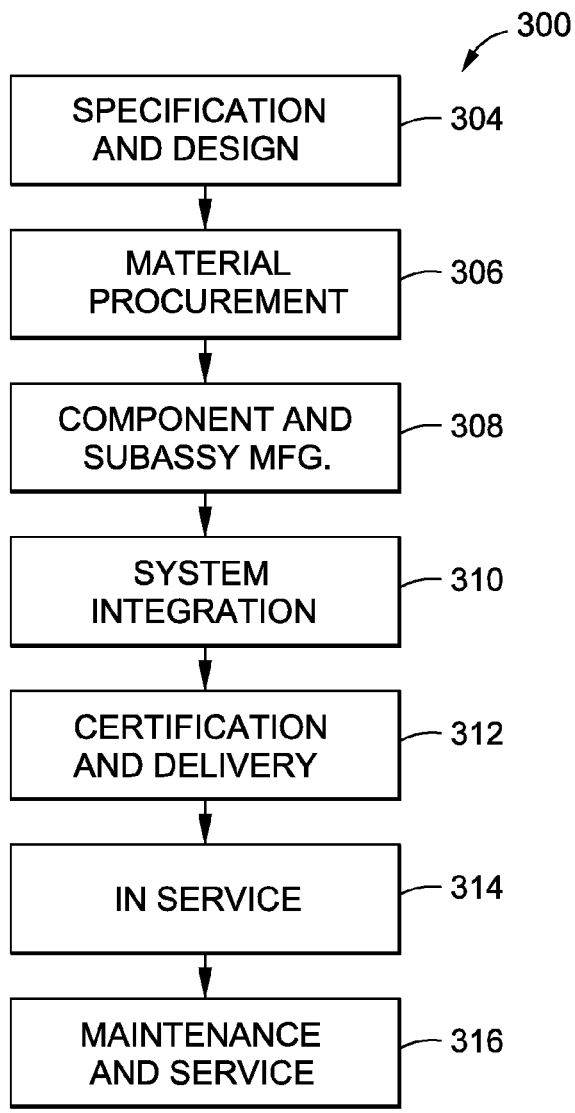
FIG. 11 is a flow diagram of an aircraft production and service methodology.
Figure 12:
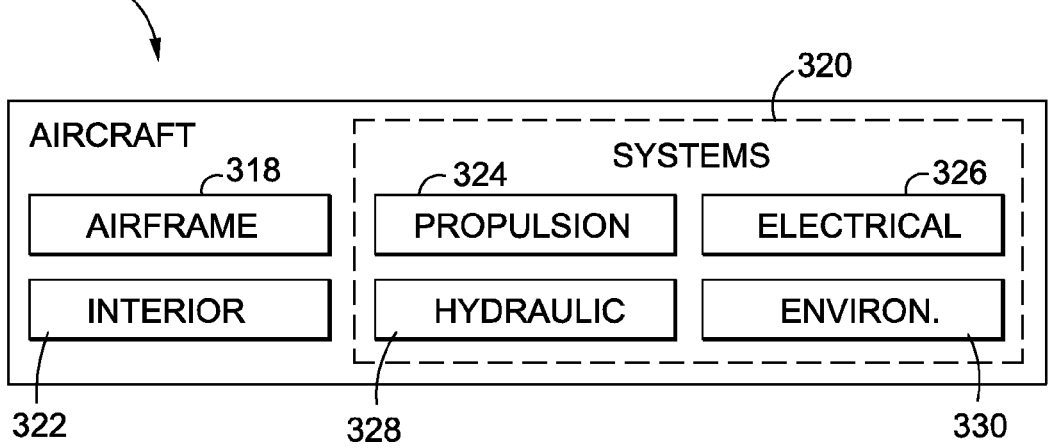
FIG. 12 is a block diagram of an aircraft.

Referring to FIGS. 11-12, embodiments of the disclosure may be described in the context of an aircraft manufacturing and service method 300 as shown in FIG. 11 and an aircraft 302 as shown in FIG. 12. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A patch for a structure, comprising:
a patch body having at least two regions including a fail-safe region and a safe-life region encompassing the fail-safe region;
the safe-life region being formed of composite material providing a mode I interlaminar fracture toughness less than the mode I interlaminar fracture toughness provided by a different composite material of the fail-safe region;
the mode I interlaminar fracture toughness of each region being a function of the composition of the composite material used in each region; and
at least one of the fail-safe region and the safe-life region has the respective following approximate range of mode I interlaminar fracture toughness values: 2.5 to 7.0 in-lb/in$^2$ and 1.5 to 3.5 in-lb/in$^2$.

2. The patch of claim 1 wherein:
the fail-safe region encompasses a rework area of the structure.

3. The patch of claim 1 wherein:
the structure is subject to a primary load inducing shear stress in a bondline between the structure and the patch body; and
the safe-life region being sized such that the strength of the bondline at an edge of the safe-life region is greater than the shear stress.

4. The patch of claim 1 wherein:
the structure is subject to a primary load inducing interlaminar stress in at least one of the structure and the regions; and
the mode I interlaminar fracture toughness for each one of the regions being greater than the interlaminar stress in at least one of the structure and the regions.

5. The patch of claim 1 wherein:
the structure is subject to a primary load inducing at least one of peel stress and shear stress in a bondline between the structure and the patch body;
the safe-life and fail-safe regions each having a taper angle; and
the taper angle for at least one of the regions being such that the bond strength at an edge of the region is greater than the shear stress and peel stress in the bondline.

6. The patch of claim 1 wherein:
the safe-life and fail-safe regions each have a taper angle; and
the taper angles of the regions decrease along a radially outward direction of the patch body.

7. The patch of claim 1 wherein:
the patch body has three regions including the fail-safe region, the safe-life region and a durability region; and
the durability region having an edge located approximately midway between the edges of the fail-safe and safe-life regions.

8. The patch of claim 7 wherein:
the durability region has the following approximate range of mode I interlaminar fracture toughness values: 2.0 to 5.0 in-lb/in$^2$.

9. The patch of claim 1 wherein:
at least one of the regions has a substantially oblong shape.

10. The patch of claim 9 wherein:
the structure is subject to a primary load oriented along a primary load direction;
the oblong shape defining a long axis; and
the patch body being configured such that the long axis is oriented substantially perpendicularly relative to the primary load direction.

11. A patch for a composite structure having a rework area with an inconsistency formed therein and being subject to a primary load oriented along a primary load direction and inducing interlaminar stress in at least one of the structure and the regions and inducing shear stress and peel stress in a bondline between the structure and the patch body, comprising:
a patch body arranged in at least one of three regions each having a substantially oblong shape having a length to width ratio within the range of from approximately 2.0 to 4.0 and defining a long axis oriented substantially perpendicularly relative to the primary load direction, the patch body being configured in at least one of a scarfed configuration and a doubler configuration, the regions including:
a fail-safe region being sized to encompass the rework area and having a taper angle within the range of from approximately 10:1 to 30:1 and a mode I interlaminar fracture toughness within the range of approximately 2.5 to 7.0 in-lb/in$^2$;
a durability region encompassing the fail-safe region and having a taper angle within the range of from approximately 20:1 to 40:1 and a mode I interlaminar fracture toughness within the range of approximately 2.0 to 5.0 in-lb/in$^2$; and
a safe-life region encompassing the durability region and having a taper angle within the range of from approximately 35:1 to 55:1 and a mode I interlaminar fracture toughness within the range of approximately 1.5 to 3.5 in-lb/in$^2$, the safe-life region being sized such that the strength of the bondline at an edge of the safe-life region is greater than the shear stress;
the mode I interlaminar fracture toughness for each one of the regions being greater than the interlaminar stress in the structure and the regions; and
the taper angle for each one of the regions being such that the bond strength at an edge of the region is greater than the shear stress and peel stress in the bondline, the taper angles of the regions decreasing along a radially outward direction of the patch body.

\* \* \* \* \*